(12) United States Patent
Duan

(10) Patent No.: US 11,275,157 B2
(45) Date of Patent: *Mar. 15, 2022

(54) OBJECT DETECTING APPARATUS, OBJECT DETECTING METHOD, AND DESIGN METHOD OF OBJECT DETECTING APPARATUS

(71) Applicant: Dolphin Co., Ltd., Koshigaya (JP)

(72) Inventor: Zhihui Duan, Kawaguchi (JP)

(73) Assignee: DOLPHIN CO., LTD., Koshigaya (JP)

( * ) Notice: Subject to any disclaimer, the term of this patent is extended or adjusted under 35 U.S.C. 154(b) by 43 days.

This patent is subject to a terminal disclaimer.

(21) Appl. No.: 16/807,897

(22) Filed: Mar. 3, 2020

(65) Prior Publication Data
US 2020/0200902 A1   Jun. 25, 2020

Related U.S. Application Data

(63) Continuation of application No. 16/220,702, filed on Dec. 14, 2018, now Pat. No. 10,620,314, which is a
(Continued)

(30) Foreign Application Priority Data

Jul. 3, 2018   (JP) .............................. JP2018-127086

(51) Int. Cl.
*G01S 7/481*   (2006.01)
*G01S 17/04*   (2020.01)
(Continued)

(52) U.S. Cl.
CPC .............. *G01S 7/4817* (2013.01); *G01S 17/04* (2020.01); *G01S 17/26* (2020.01); *G01S 17/42* (2013.01);
(Continued)

(58) Field of Classification Search
CPC ........ G01S 7/4817; G01S 17/89; G01S 17/04; G01S 17/26; G01S 17/931; G01S 17/42;
(Continued)

(56) References Cited

U.S. PATENT DOCUMENTS 5,625,183 A   4/1997 Kashitani
7,301,608 B1   11/2007 Mendenhall
(Continued)

FOREIGN PATENT DOCUMENTS

JP   H01276114 A   11/1989
JP   H05297112 A   11/1993
(Continued)

OTHER PUBLICATIONS

Niclass et al. "A 100-m Range 10-Frame/s 340×96-Pixel Time-of-Flight Depth Sensor in 0.18-μm CMOS." IEEE Journal of Solid-State Circuits, Institute of Electrical and Electronics Engineers. Feb. 2013: 559-572. vol. 48, No. 2.
(Continued)

*Primary Examiner* — Daniel L Murphy
(74) *Attorney, Agent, or Firm* — Rossi, Kimms & McDowell LLP

(57) ABSTRACT

An object detecting apparatus is provided with: a collimating assembly that converts laser light emitted by plural light-emitting points to a laser beam having a divergence angle in an arrangement direction of plural light-emitting points; and an optical assembly that projects the laser beam outward along an optical axis and guides an incident light toward a light-receiving element along the optical axis. The optical assembly is provided with a collective optics that forms an image of the incident light on a focal plane and an aperture located on the focal plane. The aperture satisfies σ≤β, where α is the divergence angle along the arrangement direction of plural light-emitting points, D is a size of a light
(Continued)

passing region of the aperture in a direction corresponding to the divergence angle, d is an effective focal distance of the collective optics, and $\beta=\arctan(D/d)$.

7 Claims, 12 Drawing Sheets

Related U.S. Application Data continuation of application No. 16/220,082, filed on Dec. 14, 2018, now Pat. No. 10,324,184.

(51) Int. Cl.
  *G01S 17/26* (2020.01)
  *G01S 17/42* (2006.01)
  *G01S 17/89* (2020.01)
  *G02B 26/10* (2006.01)
  *G01S 17/931* (2020.01)

(52) U.S. Cl.
  CPC .............. *G01S 17/89* (2013.01); *G01S 17/931* (2020.01); *G02B 26/101* (2013.01); *G02B 26/105* (2013.01)

(58) Field of Classification Search
  CPC .......................... G02B 26/105; G02B 26/101; G02B 27/0018; G02B 26/085
  USPC ........................................................ 356/4.01
  See application file for complete search history.

(56) References Cited

U.S. PATENT DOCUMENTS

| | | | |
|---|---|---|---|
| 8,767,190 B2 | 7/2014 | Hall | |
| 9,128,190 B1 | 9/2015 | Ulrich | |
| 10,012,732 B2 | 7/2018 | Eichenholz | |
| 10,324,184 B1* | 6/2019 | Duan | G01S 17/26 |
| 2002/0114053 A1 | 8/2002 | Yasuda | |
| 2004/0135644 A1 | 7/2004 | Mizoguchi | |
| 2005/0275710 A1 | 12/2005 | Dewa | |
| 2009/0009850 A1 | 1/2009 | Shirai | |
| 2013/0063799 A1 | 3/2013 | Honda | |
| 2013/0207970 A1 | 8/2013 | Shpunt | |
| 2014/0151535 A1 | 6/2014 | Mori | |
| 2017/0285148 A1 | 10/2017 | Hipp | |
| 2018/0156971 A1* | 6/2018 | Droz | G01S 7/4863 |
| 2018/0164413 A1* | 6/2018 | Gnecchi | G01S 7/4814 |

FOREIGN PATENT DOCUMENTS

| | | | |
|---|---|---|---|
| JP | H07198845 A | 8/1995 | |
| JP | H07199111 A | 8/1995 | |
| JP | 2644895 B2 | 8/1997 | |
| JP | 2004102267 A | 4/2004 | |
| JP | 2007196376 A | 8/2007 | |
| JP | 2013174775 A | 9/2013 | |
| JP | 2014109686 A | 6/2014 | |
| JP | 2015514965 A | 5/2015 | |
| JP | 2015161683 A | 9/2015 | |
| JP | 2015215405 A | 12/2015 | |
| JP | 2016133550 A | 7/2016 | |
| WO | 2011118296 A1 | 9/2011 | |
| WO | 2017095817 A1 | 6/2017 | |

OTHER PUBLICATIONS

"Photodetectors for LiDAR", Hamamatsu Photonics K.K. May 2017 (retrieved from "https://www.hamamatsu.com/resources/pdf/ssd/Photodetector_lidar kapd0005e.pdf" in Jun. 2018, and now Oct. 2018 version is stored in the same URL).
Notification of Reason(s) for Refusal issued in Japanese Application No. 2018-127086 dated Sep. 10, 2018 English translation provided.
Final Notification of Reason(s) for Refusal issued in Japanese Application No. 2018-127086 dated Nov. 5, 2018. English translation provided.
Notification of Reason(s) for Refusal of Japanese Application No. 2018-130804 dated Sep. 10, 2018. English translation provided.
Notification of Reason(s) for Refusal of Japanese Application No. 2018-206264 dated Nov. 21, 2018. English translation provided.
Notification of Reason(s) for Refusal of Japanese Application No. 2018-206270 dated Nov. 21, 2018. English translation provided.
Notice of Allowance issued in U.S. Appl. No. 16/220,082 dated Apr. 10, 2019.
Office Action issued in Japanese Appln. No. 2019-009890 dated Feb. 26, 2019. English translation provided.
Hamamatsu Photonics K.K. "MPPC (Multi-Pixel Photon Counter) S13720 series" Web. May 2018: 1-9. <URL: http://www.hamamatsu.com/resources/pdf/ssd/s13720_series_kapd1060j.pdf> English translation provided.
Office Action issued in U.S. Appl. No. 16/220,702 dated Jun. 13, 2019.
Notice of Allowance issued in U.S. Appl. No. 16/220,702 dated Dec. 3, 2019.

* cited by examiner

{Fig. 1}
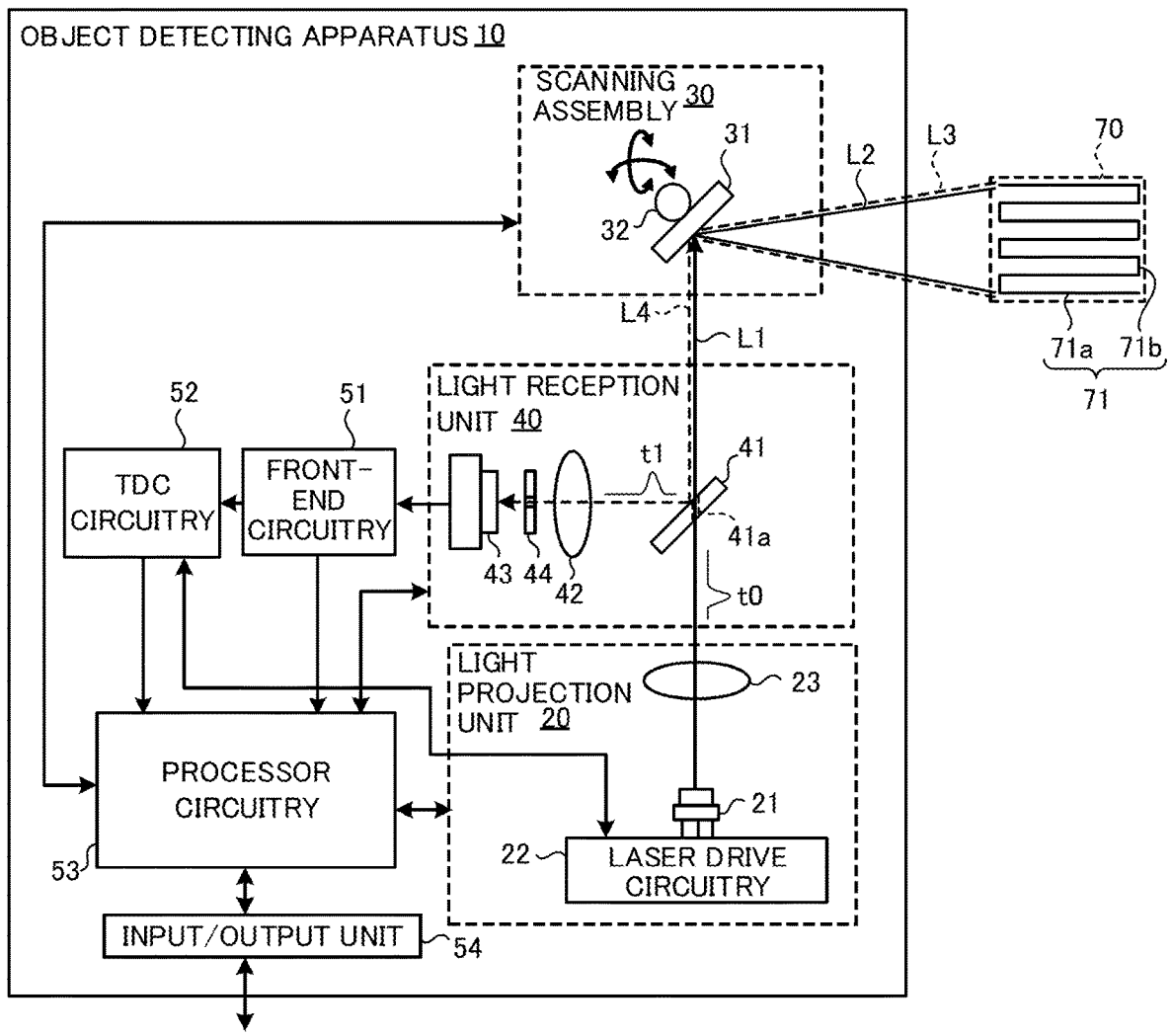
{Fig. 2}
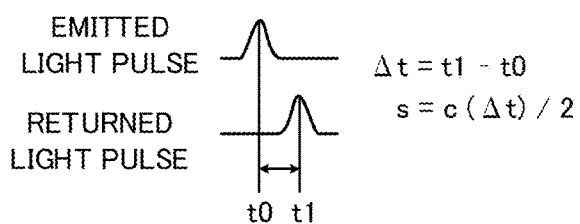
$\Delta t = t1 - t0$
$s = c(\Delta t)/2$

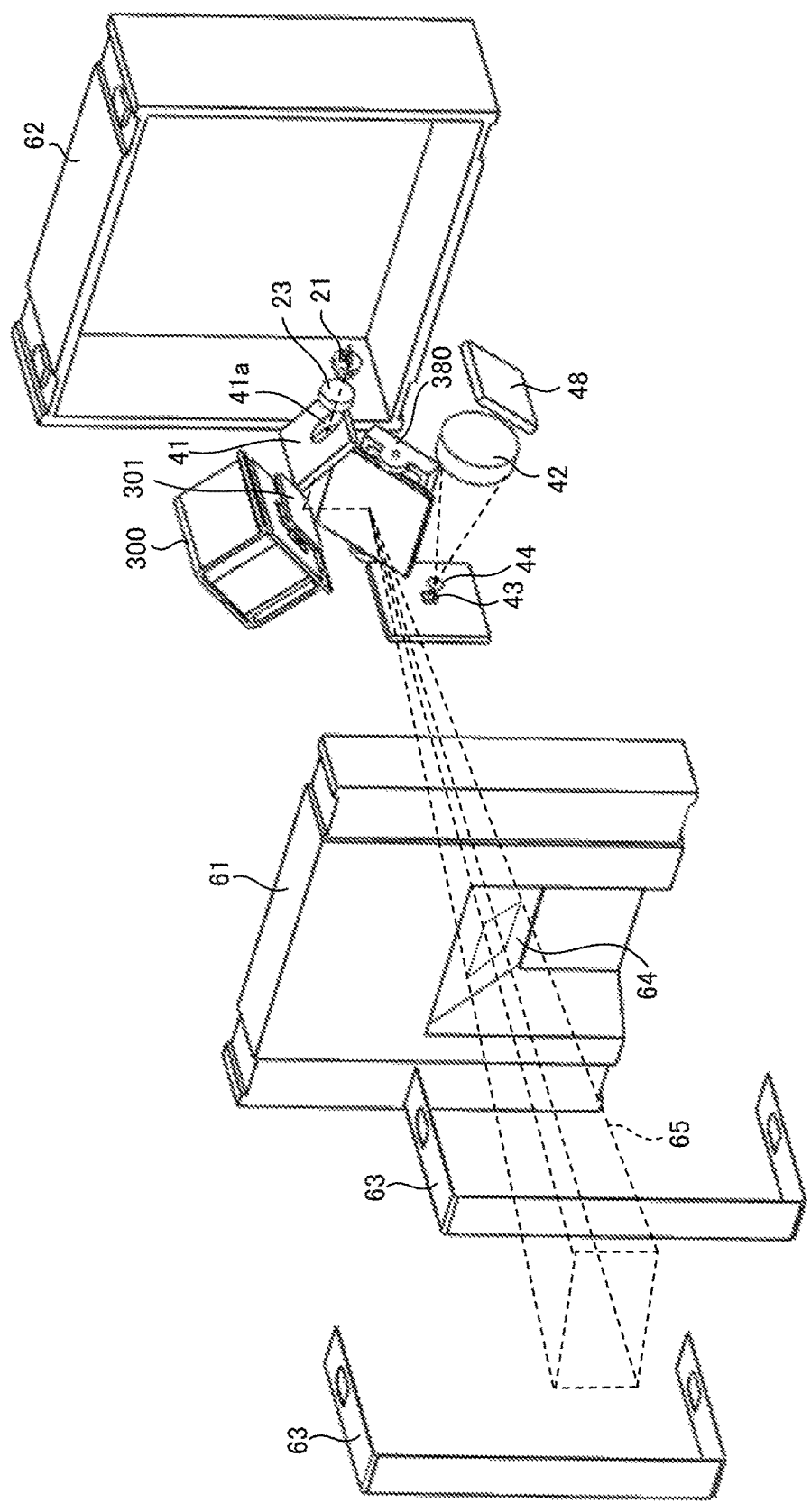
{Fig. 3}

{Fig. 4}
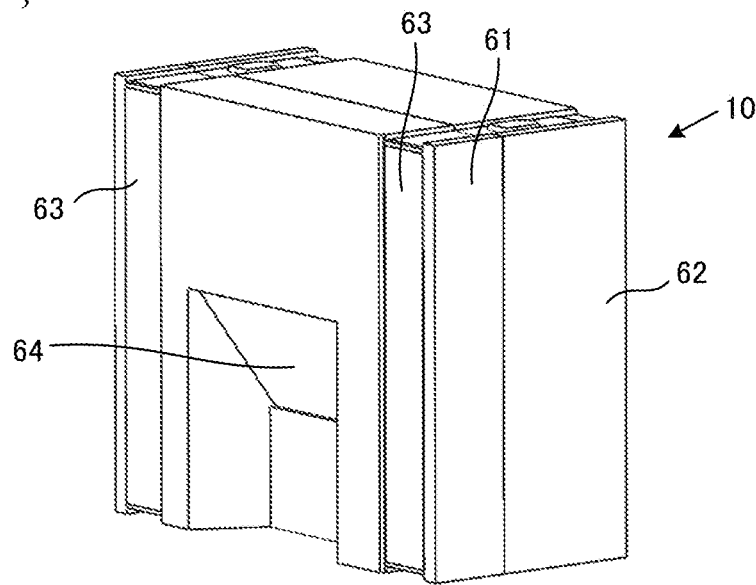
{Fig. 5}
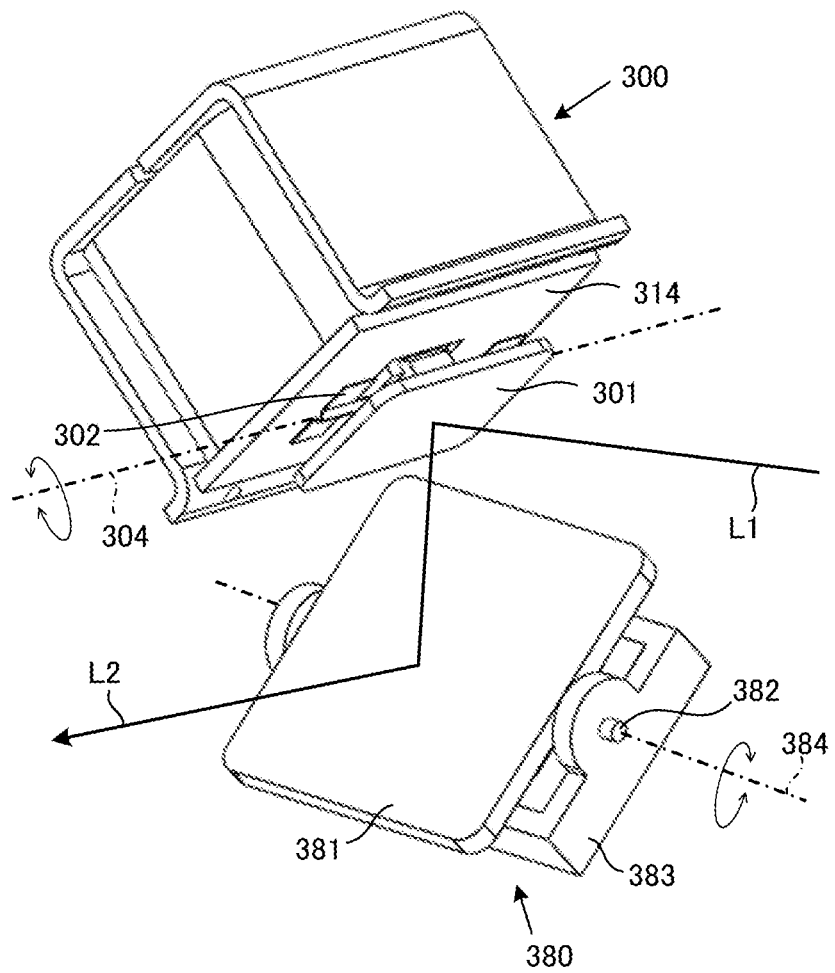

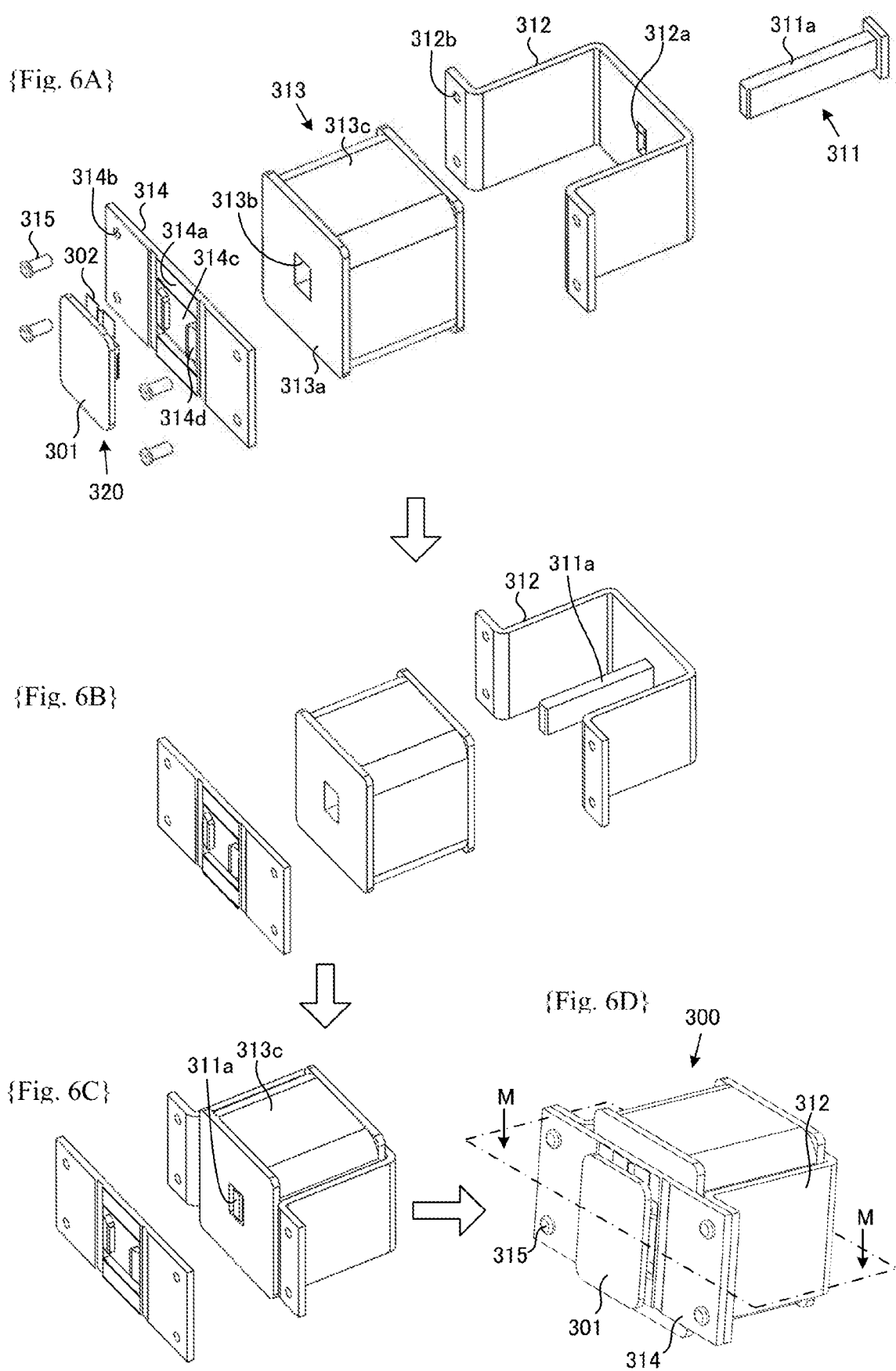

{Fig. 7}
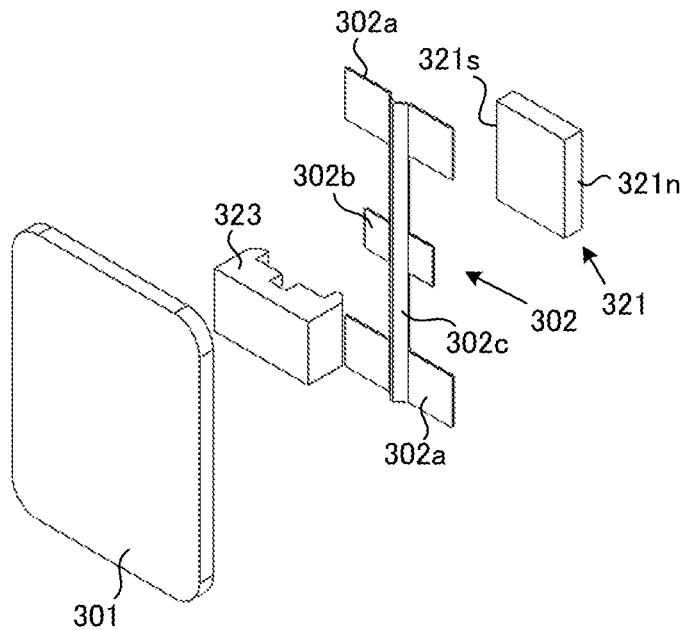
{Fig. 8A}
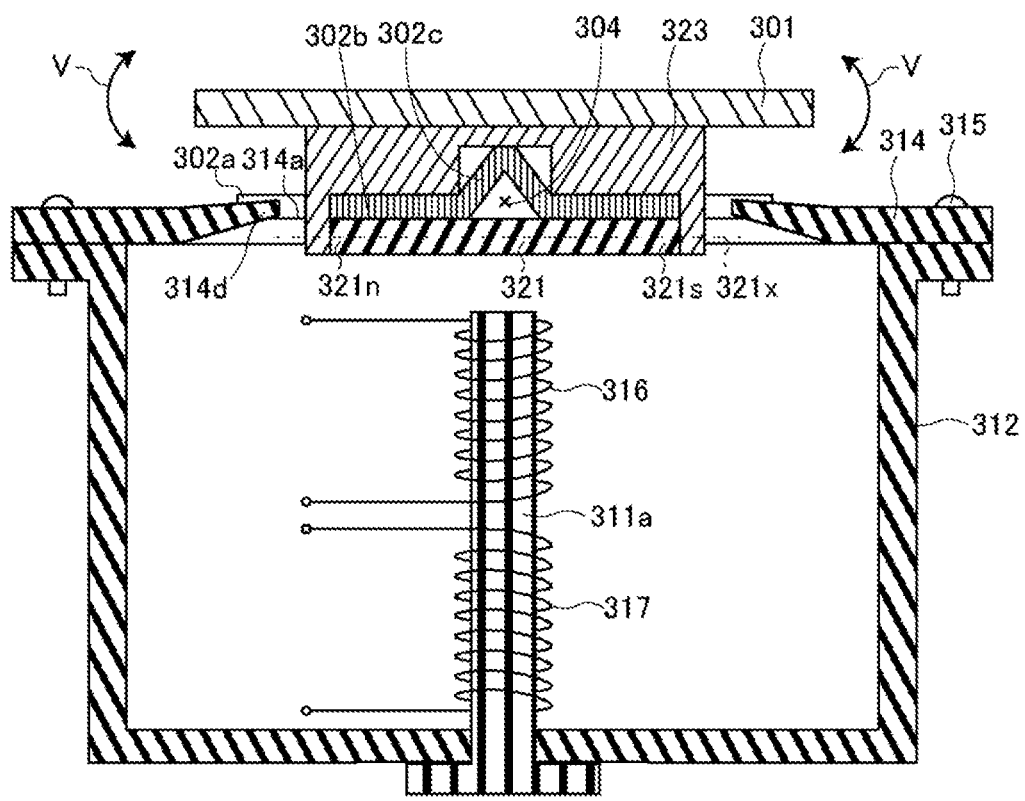

{Fig. 8B}
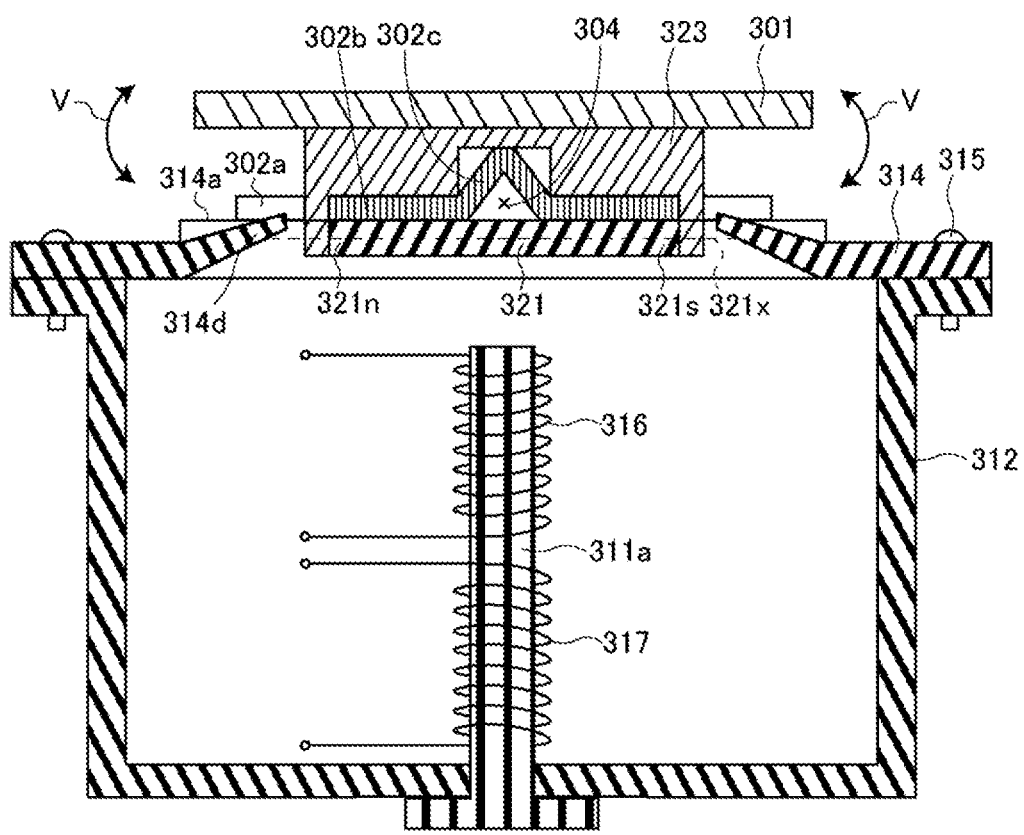

{Fig. 9}
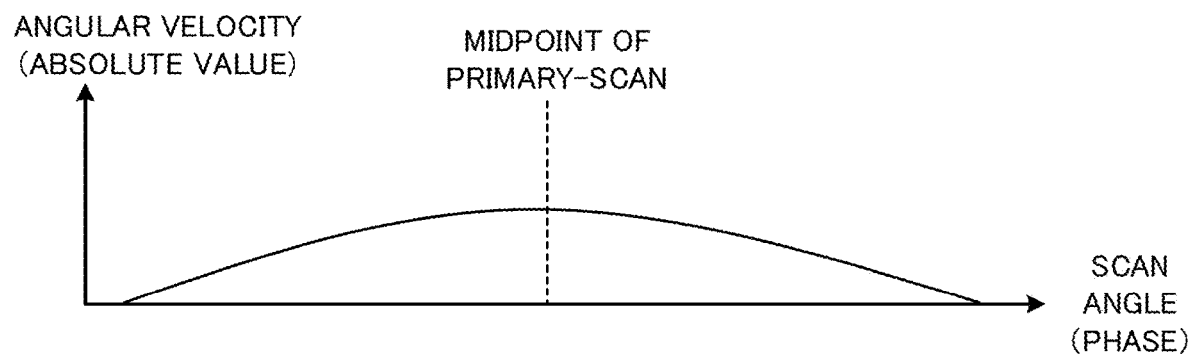
{Fig. 10}
{Fig. 11}
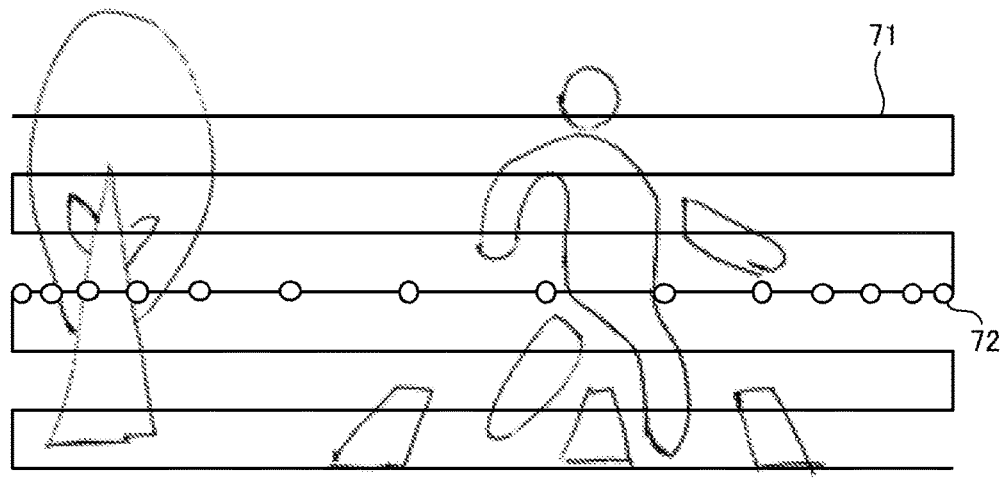

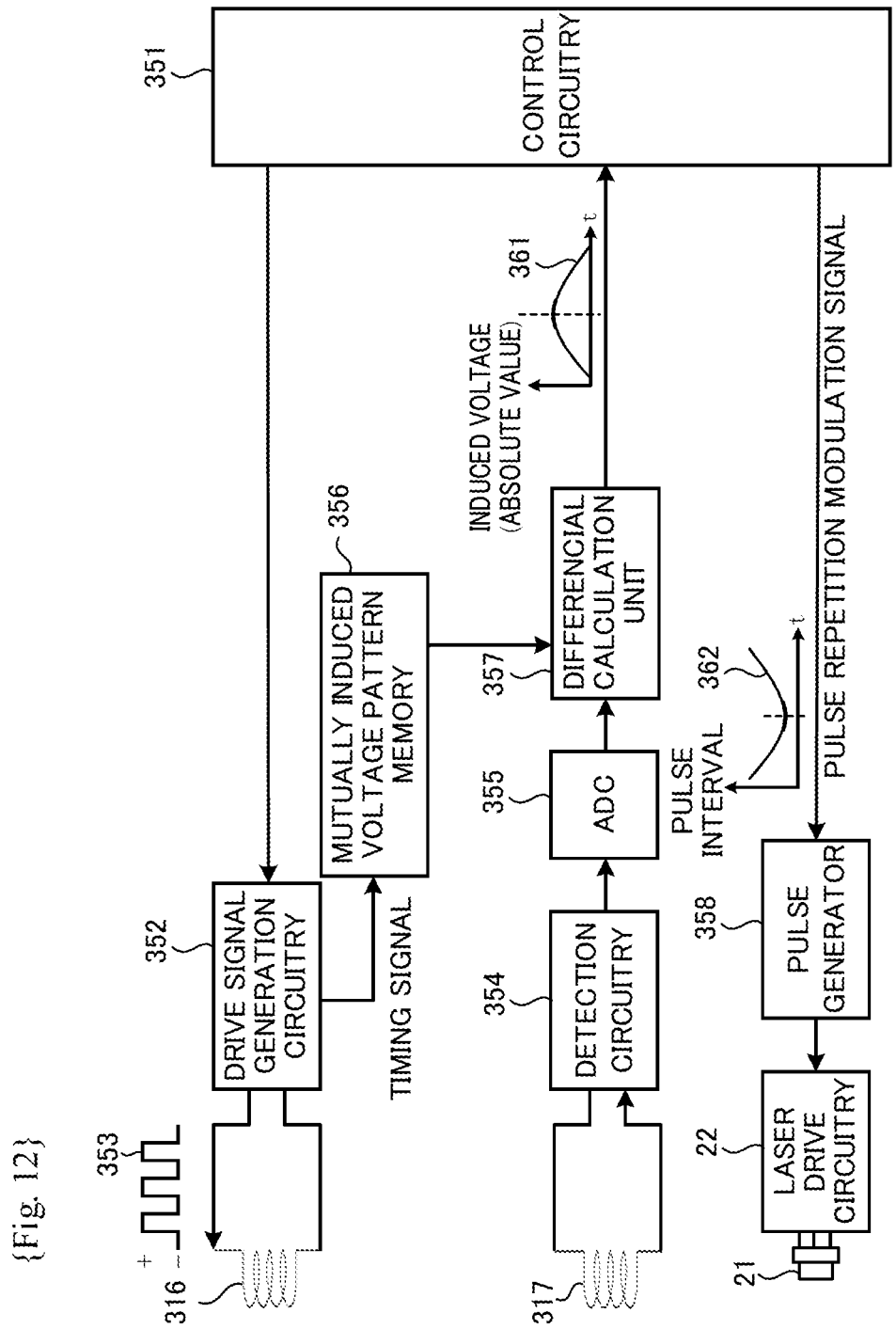
{Fig. 12}

{Fig. 13}
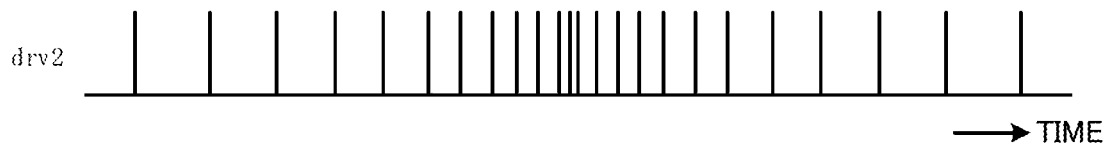
{Fig. 14}
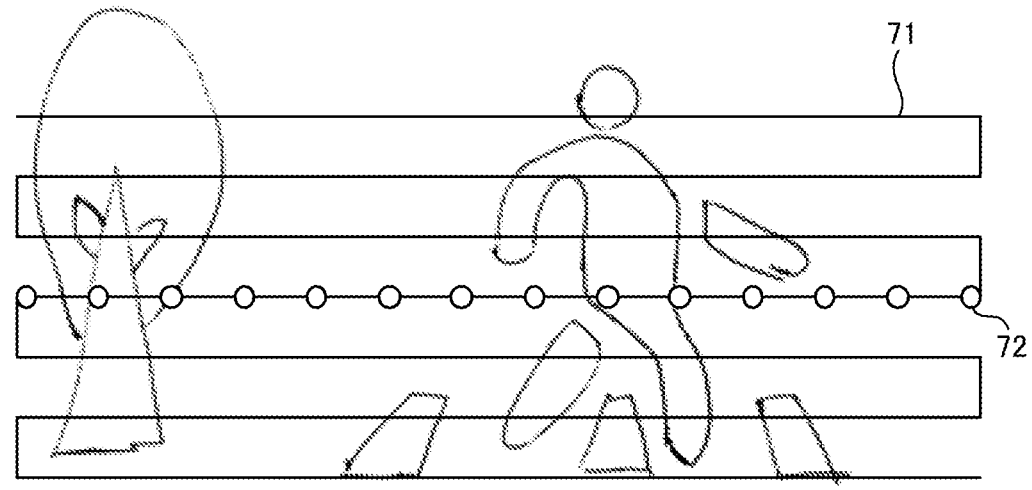

{Fig. 15}
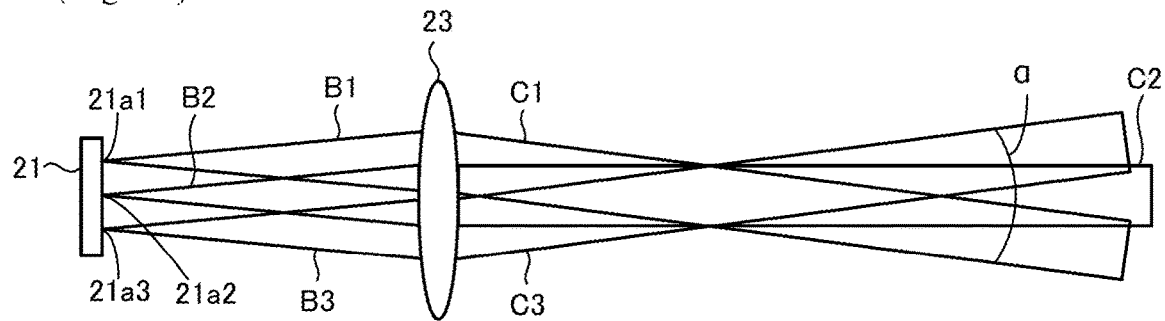
{Fig. 16}
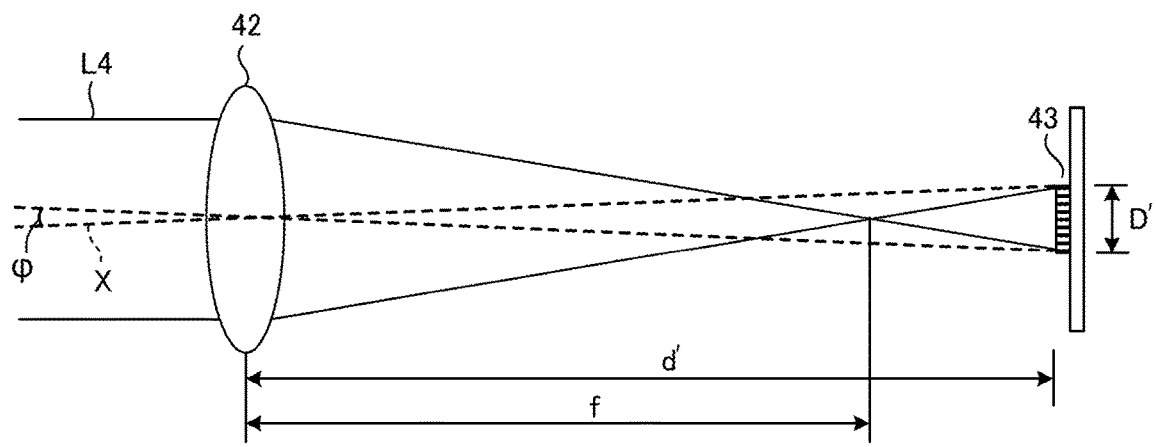
{Fig. 17}
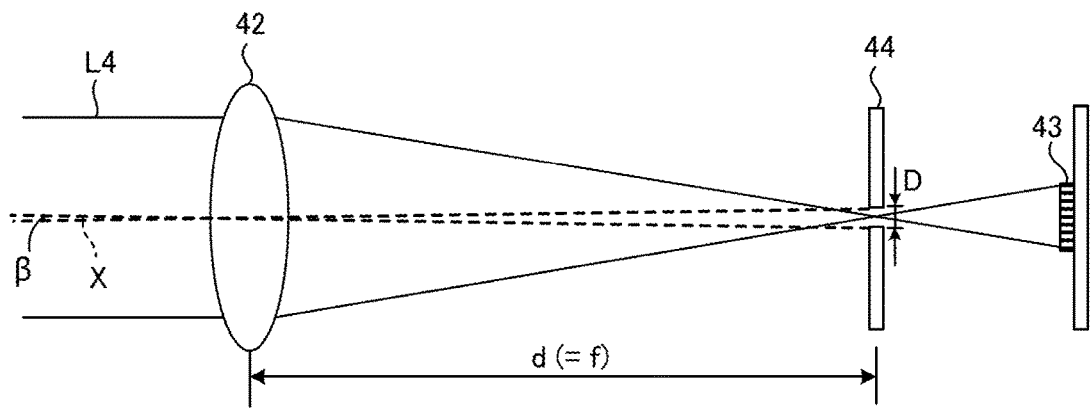

{Fig. 18}
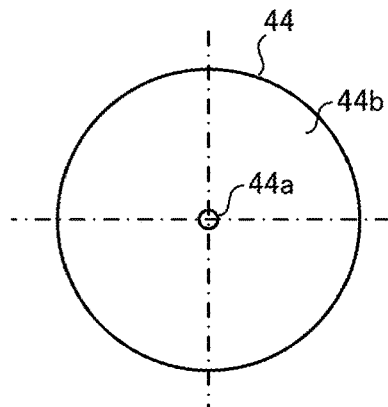
{Fig. 19}
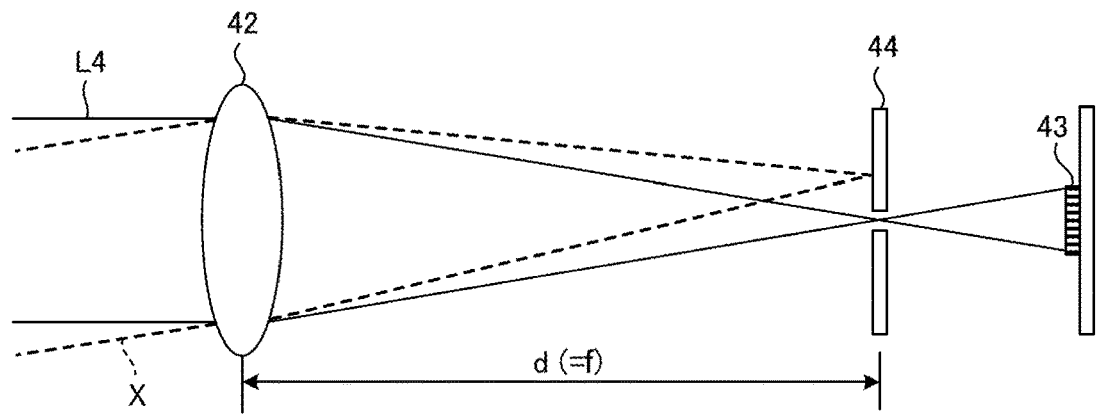
{Fig. 20}
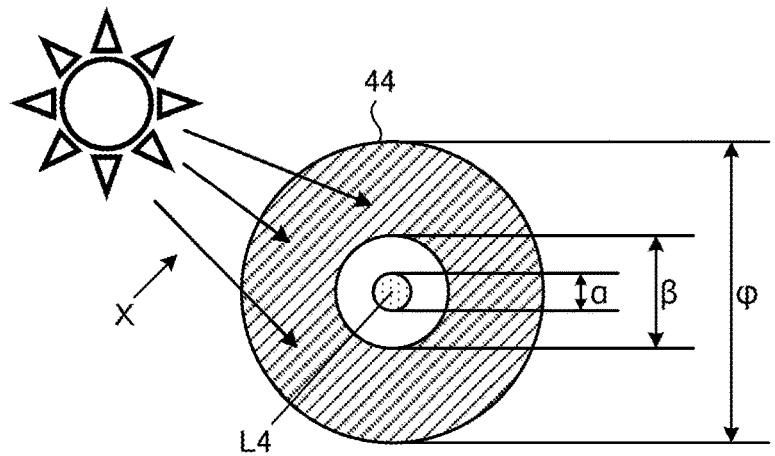

{Fig. 21}
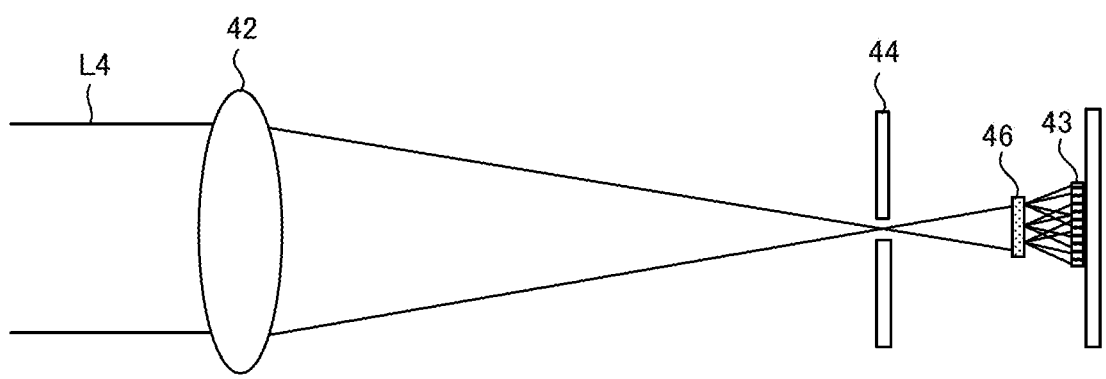

OBJECT DETECTING APPARATUS, OBJECT DETECTING METHOD, AND DESIGN METHOD OF OBJECT DETECTING APPARATUS

TECHNICAL FIELD

The invention relates to an object detecting apparatus and an object detecting method that uses a laser beam and detects an object along an optical path of the laser beam. The invention also relates to a design method of the above object detecting apparatus.

Background

An object detecting apparatus is known that it projects a pulse of a laser beam outward and then detects the laser beam returned back which is reflected by an object thereby detects the distance and the object which is located on the optical path of the laser beam. Such object detecting apparatus is called LiDAR (Light Detection and Ranging).

Recently, LiDAR is beginning to be used in a field so-called autonomous driving. It often compensates such disadvantages, for examples, a camera sensor is susceptible to external illumination environment and a milliwave radar is with a low resolution. Such LiDAR is sometimes combined with a camera sensor or a milliwave radar to accurately detect a relatively small obstacle under driving environment.

One example of LiDAR structure used in the autonomous driving is disclosed in the patent literature 1 (PTL1). In the LiDAR disclosed in PTL1, a near-infrared laser as the light source and a light detecting element as the receiver establish a pair which is located on an electrical circuit board to match the measuring direction. To obtain the high resolution distance information in the field of view, it uses thirty two or sixty four pairs. Therefore, the cost of the apparatus is very high.

Another example of LiDAR is disclosed in non-patent literature 1 (NPL1). The LiDAR disclosed in NPL1 has a rotating polygon mirror with three surfaces where each surface has a different inclining angle. The polygon mirror deflects a laser beam and then projects the laser beam within a total vertical angle with 4.5 degree. The reflected light from the object is returned to the same surface of the polygon mirror again and collected to the light-detecting element for the object detection.

The advantage of the LiDAR disclosed in NPL1 is that it can detect the reflected light from different vertical positions only by single light detecting element. However, since the reflective surface of the polygon mirror has the different inclined angles, the design of the gravity center of the rotating polygon mirror becomes quite difficult and it brings about an extra problem of the increased cost. When the polygon mirror is running in high speed rotation for a long time, the heat generation and the friction of the bearing bring about the maintenance problem in the circumstance of the long-time usage.

The LiDAR using the rotating mirror is disclosed also in non-patent literature 2 (NPL2), but there is no detailed description of the configuration in NPL2.

CITATION LIST

Patent Literature

{PTL1} U.S. Pat. No. 8,767,190

Non Patent Literature

{NPL1} Cristiano Niclass, et al., "A 100-m Range 10-Frame/s 340×96-Pixel Time-of-Flight Depth Sensor in 0.18-μm CMOS", IEEE JOURNAL OF SOLID-STATE CIRCUITS, Institute of Electrical and Electronics Engineers, FEBRUARY 2013, VOL. 48, NO. 2, p. 559-572

{NPL2} Shimizu, Naoshige "Redundant system and LiDAR to realize level 3, Audi becomes pioneer of autonomous driving" Nikkei Automotive, Nikkei Business Publications, September, 2017, pp. 22-23

SUMMARY

To detect an object with lower reflectivity at the extend range by a LiDAR, an ordinary approach is to increase the detection sensitivity of the light-receiving element (light-detecting element) so as to detect weaker reflected light. However, the ambient light is simultaneously incident through the optical path where the reflected light returned from the object. As a result, when increasing the detection sensitivity of the light-receiving element, not only the reflected light from the object, but also the detected signal of the ambient light increases as well. Thus, it increases the probability of the malfunction to measure the ambient light as the reflected light from the object.

Meanwhile, another straightforward approach is to increase the optical output level of the projected laser beam so as to increase the intensity of the reflected light, and thereby to relatively decrease the influence of the ambient light. However, for generating a high-power laser beam, it results in the increased size and the increased cost of the apparatus, and brings about a laser safety problem while projecting the high-power laser beam in road driving circumstance.

Note that such problem from the ambient light described above is independent on whether the laser beam is scanned or not, it also arises in the case of detecting an object only along a specific direction.

With consideration of the circumstances above, the purpose of the present invention is to reduce the influence of the ambient light with easier means and lower cost when detecting the returned light with a light detecting element, where such returned light is the reflection from an object which the laser beam is projected to.

To achieve the purpose above, the object detecting apparatus according to the present invention is provided with an optical assembly configured to project a laser beam outward, a light-receiving element, the optical assembly further configured to guide an incident light toward the light-receiving element, and an object detecting assembly configured to detect a distance to an object located along the optical path of the projected laser beam based on a projection timing of the laser beam and a timing of a light detection signal output from the light-receiving element, wherein the optical assembly comprises a collective lens configured to form an image of the incident light on a focal plane and an aperture located on the focal plane of the collective lens.

The optical assembly is preferably provided with a laser light source comprising a plurality of light-emitting points arranged thereon, and a lens assembly configured to convert the laser light emitted by the plurality of light-emitting points to a laser beam with a divergence angle in an arrangement direction of the plurality of light-emitting points. The light-receiving element is preferably a silicon photomultiplier (SiPM). The optical assembly preferably projects the laser beam outward along an optical axis and guide an incident light toward the light-receiving element along the same optical axis.

It is also preferable that the object detecting apparatus further includes a scanning assembly configured to periodically change projection direction of the laser beam, and the object detecting assembly configured to detect a distance to an object located along an optical path of the projected laser beam and a direction in which the object is located, based on the projection timing and the projection direction of the laser beam and the timing of the light detection signal output from the light-receiving element.

The optical assembly preferably includes an optical element configured to separate the incident light from an optical path of the laser beam to be projected, and a collective lens configured to form an image of the incident light separated by the optical element on a focal plane, and an aperture located on the focal plane of the collective lens, wherein $\alpha \le \beta$ is satisfied, in which $\alpha$ is the divergence angle, and D is a size of a light passing region of the aperture corresponding to the divergence angle along the arrangement direction, and d is a distance between the collective lens and the aperture, and $\beta = \arctan(D/d)$.

Further, the invention provides another embodiment that $1 \le \beta/\alpha \le 3$ is satisfied.

The invention also provides an embodiment that the incident light passed through the collective lens is incident on an entire light-receiving surface of the silicon photomultiplier.

In addition, the invention provides an embodiment that the object detecting apparatus further includes a light diffuser between the aperture and the light-receiving element.

Further, the invention provides an embodiment of an object detecting apparatus to realize a scan performance by periodically changing projection direction of a laser beam in a compact and highly durable configuration.

This object detecting apparatus is disclosed with a configuration that, an optical assembly configured to project a laser beam outward, a scanning assembly configured to periodically deflect the projection direction of the laser beam, a light-receiving element, the optical assembly further configured to guide an incident light toward the light-receiving element, and an object detecting assembly configured to detect a distance to an object located along the optical path of the projected laser beam and a direction in which the object is located based on a projection timing and the projection direction of the laser beam and a timing of a light detection signal output from the light-receiving element. The scanning assembly therein further comprises a torsion spring coupled with a support member, a mirror coupled to a first side of the torsion spring and configured to reflect the laser beam, a permanent magnet coupled to a second side of the torsion spring where the permanent magnet is placed with an N-pole and an S-pole thereof across a rotational axis of the torsion spring, a driving coil faced to the permanent magnet and located on the first side of the torsion spring beyond the permanent magnet, a magnetic substance assembly surrounding the driving coil, a driving circuitry configured to apply a driving signal periodically varying voltage or current to the driving coil, a speed detecting circuitry configured to detect a moving speed of the mirror, and a pulse controller configured to control a pulse interval of the laser beam projected by the optical assembly based on the moving speed detected by the speed detecting circuitry, the mirror reciprocating corresponding to the driving signal applied by the driving circuitry.

In another embodiment of the invented object detecting apparatus, it is preferred that the scanning assembly further comprises a sensing coil with a common core member of the driving coil, the speed detecting circuitry is configured to detect the moving speed of the mirror based on a voltage or a current generated in the sensing coil, and the pulse controller is configured to control the pulse interval of the laser beam projected by the optical assembly based on the voltage level or the current level detected by the speed detecting circuitry.

Further, it is preferred that the pulse controller is configured to adopt a shorter pulse interval when the detected voltage or current is at a first level indicating that the mirror is located near a midpoint section along a path of the reciprocation, and configured to adopt a longer pulse interval when the detected voltage or current is at a second level indicating that the mirror is located near an end section of the path of the reciprocation.

Alternatively, it is also preferred that end portions of the magnetic substance assembly are facing to the N-pole and the S-pole of the permanent magnet respectively and are located at a position farther than a center line of the permanent magnet along the N-pole and the S-pole.

Further, it is preferred that the magnetic substance assembly further comprises lift-up sections located along an extended direction toward a movable member where the movable member comprises the torsion spring, the mirror and the permanent magnet, and end portions of the lift-up sections that are facing the N-pole and the S-pole of the permanent magnet respectively and are at positions farther than the center line of the permanent magnet along the N-pole and the S-pole.

Alternatively, it is also preferred that the torsion spring has a folded shape with a straight folded peak, and the permanent magnet is coupled with an opposite side of the folded peak with the N-pole and S-pole thereof across the folded peak.

Further, it is preferred that the folded peak is in a V-shaped cross-section.

Further, it is preferred that one end of an axis of the driving coil is facing to a midpoint of the N-pole and the S-pole of the permanent magnet.

In addition, a control method is disclosed in the invention to the object detecting apparatus that comprises an optical assembly configured to project a laser beam outward, a scanning assembly configured to periodically deflect the projection direction of the laser beam, a light-receiving element, a light-receiving optical assembly configured to guide an incident light toward the light-receiving element, and an object detecting assembly configured to detect a distance to an object located along the optical path of the projected laser beam and a direction in which the object is located based on a projection timing and the projection direction of the laser beam and a timing of a light detection signal output by the light-receiving element. The scanning assembly therein comprises a torsion spring coupled with a support member, a mirror coupled to a first side of the torsion spring and configured to reflect the laser beam, a permanent magnet coupled to a second side of the torsion spring where the permanent magnet is placed with an N-pole and an S-pole thereof across a rotational axis of the torsion spring, a driving coil faced to the permanent magnet and located on the first side of the torsion spring beyond the permanent magnet, a magnetic substance assembly surrounding the driving coil, and a driving circuitry configured to apply a driving signal periodically varying voltage or current to the driving coil, the mirror reciprocating corresponding to the driving signal applied by the driving circuitry. The control method further comprises a method of detecting the moving speed of the mirror and controlling pulse interval of the laser beam projected by the optical assembly based on the detected moving speed.

In such method, it is preferred that the scanning assembly further comprises a sensing coil with a common core member of the driving coil and a controlling means to control the pulse interval of the laser beam based on a voltage or current level generated in the sensing coil.

It is also preferred that the controlling means is to control the pulse interval to be shorter when the detected voltage or current is at a first level indicating that the mirror is located near a midpoint section along a path of the reciprocation, and control the pulse interval to be longer when the detected voltage or current is at a second level where the mirror is located near an end section of the path of the reciprocation.

The invention is also related to a storage medium which is a non-transitory machine-readable storage medium containing program instructions executable by a computer, and when executed, causing one computer or a plurality of computers in cooperation to control necessary hardware and execute any of the above methods.

The storage medium disclosed in this invention is further related to a program which is a computer program for executing by one computer or a plurality of computers in cooperation to control necessary hardware and execute any of the methods above.

Not limited in the apparatus, the method, the program or the like described in the paragraph above, the invention can also be performed as an arbitrary form such as an apparatus, a system, a method, a computer program, a non-transitory machine-readable storage medium containing program, or the like.

By merits from the configuration described above, it makes it easier to reduce the influence of the ambient light at lower cost when detecting the returned light with the light detecting element, where such returned light is the reflection from an object which the laser beam is projected to.

BRIEF DESCRIPTION OF DRAWINGS

FIG. 1 is a block diagram illustrating principal configuration related with an embodiment of an object detecting apparatus 10 according to the present invention with focus on the functions thereof.

FIG. 2 is the illustration to explain the principle of object detection in the object detecting apparatus 10.

FIG. 3 is an exploded perspective view to illustrate one of an exemplary structure which has such principal configuration in the object detecting apparatus 10.

FIG. 4 is a perspective view to illustrate an external appearance of the object detecting apparatus 10.

FIG. 5 is an enlarged view of FIG. 3 to illustrate the outline of the external appearance and the arrangement of actuators 300, 380.

FIGS. 6A-6D are an exploded perspective view to schematically illustrate the element structures in the arrangement of actuator 300 and an outline of the assembling process.

FIG. 7 is an exploded perspective view to illustrate the structure of movable member 320 of the actuator 300.

FIG. 8A is a cross-sectional view from M direction indicated by the arrow mark in FIG. 6D.

FIG. 8B is a cross-sectional view corresponding to FIG. 8A, illustrating a configuration of a modified example of the actuator 300.

FIG. 9 is a graph illustrating the relation between a scan angle of the mirror 301 and an absolute value of angular velocity of the scan.

FIG. 10 is a chart illustrating an example of a drive signal to drive a laser diode module 21.

FIG. 11 is an illustration of the spot distribution on a scan line formed by the projected light L2 when the drive signal indicated in FIG. 10 is applied.

FIG. 12 is a diagram to illustrate a configuration together with the coupled peripheral circuitry of a pulse controller for controlling the pulse interval of the drive signal to the laser diode module 21.

FIG. 13 is a chart to illustrate an embodiment of the drive signal generated in the circuitry of FIG. 12.

FIG. 14 is an illustration of the spot distribution on a scan line formed by the projected light L2 when the drive signal indicated in FIG. 13 is applied.

FIG. 15 shows an outline to illustrate the optical path of the laser beam projected from a light projection unit 20.

FIG. 16 is an illustration of the optical path of the returned light L4 passing through a collective lens 42 in case there is no aperture 44.

FIG. 17 is an illustration of the optical path of the returned light L4 passing through a collective lens 42 in case there is an aperture 44.

FIG. 18 is an illustration to indicate the arrangement of a light passing region of the aperture 44.

FIG. 19 is an illustration to explain the merit of the aperture 44.

FIG. 20 is another illustration to explain the merit of the aperture 44.

FIG. 21 an illustration of the optical path of the returned light L4 passing through a collective lens 42 where a light diffusing member 46 is applied to the arrangement indicated in FIG. 17.

DESCRIPTION OF EMBODIMENTS

Embodiments of the invention are described by reference to the drawings.

1. Overall Configuration of an Object Detecting Apparatus (from FIG. 1 to FIG. 4)

First, the overall configuration of the object detecting apparatus disclosed as an embodiment of the invention will be described in FIG. 1 and FIG. 2 with the explanation focusing on the principal configuration and their functions thereof. FIG. 1 is a block diagram illustrating the principal configuration of the object detecting apparatus focusing on the functions thereof. FIG. 2 is an illustration to explain the principle of the object detection in the object detecting apparatus.

As an embodiment of the object detecting apparatus 10, it projects a laser beam outward and detects the laser beam which is reflected by an external object and thereafter returned back to the apparatus 10, thus to detect a distance to the object located along the optical path of the laser beam and a direction which the object is located based on the time difference between light projection timing and detection timing of the reflected light. As illustrated in FIG. 1, the object detecting apparatus 10 comprises a light projection unit 20, a scanning assembly 30, a light reception unit 40, a front-end circuitry 51, a Time-to-Digital Converter (TDC) circuitry 52, a processor circuitry 53, and an input/output unit 54

The light projection unit 20 is for projecting the laser beam outward, and comprises a laser diode module (LD module) 21, a laser drive circuitry 22, and a collimating lens assembly 23.

The LD module 21 is a light-emitting unit which generates a laser light based on a drive signal applied to the laser drive circuitry 22. The LD module 21 comprises a plurality of light-emitting points to increase the optical intensity of the output. Certainly, such LD module may have single light-emitting point. There is no specific constraint on the wavelength of the laser light. For example, the near-infrared light is also preferred in the present invention.

The laser drive circuitry 22 generates the drive signal based on parameters provided by the processor circuitry 53, and applies such drive signal to the LD module 21 for lighting light-emitting points at a specific timing. The lighting of the LD module 21 is modulated in an intermittent operation by pulse signal waveform.

The collimating lens assembly 23 converts the laser light output from the LD module 21 to a general collimated light beam. For example, it is a collimator lens with convex shape with its focal point alignment to the center position of the plurality of light-emitting points Moreover, a laser beam L1 formed by the collimating lens assembly 23 passes through a light-transmitting area 41a of a mirror 41 which is comprised in the light reception unit 40, and is reflected by minor assembly 31 of the scanning assembly 30 and transmits outward as the projected light L2.

The scanning assembly 30 comprises an actuator assembly 32 with the reflective mirror assembly 31, and deflects the laser beam exiting from the light projection unit 20 and reciprocally scan within the predetermined field of view (FOV) 70. The actuator assembly 32 periodically changes the orientation of the minor assembly 31 located along the optical path of the laser beam to thereby periodically change the light projection direction of the laser beam.

Though single actuator is illustrated in FIG. 1, the actuator assembly 32 may comprise two actuators 300 and 380 which respectively oscillate the minors around the different axes described as the embodiment in FIG. 3 and FIG. 5. The actuator 300 scans along the primary scan direction and therefore forms a primary scanning (Horizontal) line 71a. A second direction (Vertical) scan line 71b is formed by intercepting a second minor which is coupled with the actuator 380 at the end of the primary scanning line and changing its orientation, thus adjusts a scan position in the second scan direction.

Note that the lighting of the LD module 21 is modulated in an intermittent operation, the actual scan line 71 is not a continuous line but appeared as a series of discrete beam spots.

The light reception unit 40 might be a module which detects the incident light from the exterior of the object detecting apparatus 10. It might comprise the minor 41 described above, a collective lens 42, a light-receiving element 43, and an aperture 44. The light to be detected by the light reception unit 40 is supposed only those reflected light of the laser beam projected from the object detecting apparatus 10 and thus returned back to the object detecting apparatus 10. The returned light L3 is the scattered proportion by an object surface reverse to the optical path of the projected laser beam. The returned light L3 thereafter returns back along the retro-reflective direction which is substantially the same but the reverse path to the projected light L2 and reaches the mirror 41 as the returned light L4.

The mirror 41 is a fixed mirror with a first light-transmitting area 41a permitting the laser beam exiting from the light projection unit 20 to pass therethrough, and a second light-reflective area reflecting the returned light L4 to the light-receiving element 43. At the position of the mirror 41, the returned light L4 is occupying much wider area than the laser beam L1, therefore the proportion of the returned light L4 out of the first light-transmitting area 41a is incident to the second light-reflective area and thereafter reflected toward the light-receiving element 43.

The collective lens 42 collects the returned light L4 reflected by the mirror 41 and forms an image of such incident light on a specific focal plane thereof.

The light-receiving element 43 is a light-detecting element that outputs a detection signal corresponding to the intensity of light falling on its light-receiving surface. In this embodiment, a silicon photomultiplier (SiPM) is used as the light-receiving element which will be described in detail in the succeeding paragraphs.

The aperture 44 is arranged on the focal plane of the collective lens 42 and blocks light falling on the area out of an opening area thereof. The detailed configuration and the purpose of the aperture 44 will also be described in the succeeding paragraphs.

The minor 41, the collective lens 42, and the aperture 44 in the light reception unit 40 described above constitute a light-receiving optical assembly.

The front-end circuitry 51 coupled with the light reception unit 40 processes the detection signal from the light-receiving element 43 to a waveform preferred for the timing detection at the TDC circuitry 52.

The TDC circuitry 52 generates a digital output representative of a time delay between timing t0 of a lighting pulse of the laser beam L1 and timing t1 of an output pulse of the returned light L4 corresponding thereto, based on the driving signal applied to the laser drive circuitry 22 and the detection signal after processed by the front-end circuit 51.

Between a pulse of the projected light and a pulse of the returned light, the time delay occurs when the projected light reaches the object along the optical path and returns to the object detecting apparatus 10. Thus, based on the time delay zit, a distance s as illustrated in FIG. 2 from the apparatus 10 to the object can be calculated as $$s = c \cdot (\Delta t)/2,$$

where c is the velocity of light. In more accurate meaning, s is the length of the optical path from the object to the light-receiving element 43.

The processor circuitry 53 controls the operations of the configurations illustrated in FIG. 1. The processor circuitry 53 may be constructed by a general-purpose computer which comprises CPU, ROM, RAM and so on and executes software, or by a specific hardware configuration, or by the combination of them. The processor circuitry 53 performs, for example, the calculation of the distance to the object based on the output signal from the TDC circuitry 52, and the calculation of the direction in which the object is located based on the timing of scan of the scanning assembly 30 (the direction of the projected light L2) at a time when detecting the returned light. As the detailed description in the succeeding paragraphs, the processor circuitry 53 also performs the control of the pulse interval of lighting of the LD module 21 based on the orientation of the mirror assembly 31 in the scanning assembly 30 (actuator 300 and/or 380).

The input/output unit 54 inputs/outputs information from/to peripherals. The input/output of the information mentioned herein includes such operations of wired or wireless communication with peripheral apparatus, receipt of user operations with buttons, touch panels or the like, and indication to users with displays, lamps, buzzers, vibrators or the like. The information output from the unit 54 might be the information related to the detected object (for example, raw data of the distance and/or direction, or furtherly the information indicating the specific size, the position, the moving speed or the like based thereon), or those information related to operation status or setting status of the object detecting apparatus 10. The information input by the unit 54 might be, for example, the information related to the operation settings of the object detecting apparatus 10.

The communication counterpart of the input/output unit 54 might be, for example, a vehicle with autonomous driving function. With supplied information of the object detected by the object detecting apparatus 10, an autonomous driving system might make plan of driving route so as to avoid collisions to the detected object based on such information.

It is also preferred to implement the object detecting apparatus 10 to be a system coupled with its communication counterpart such as a vehicle, a drone, an aircraft or the like.

The outline drawing of the structure of the object detecting apparatus 10 is shown in FIG. 3 and FIG. 4. FIG. 3 is an exploded perspective view illustrating the structures with the principal configurations of the object detecting apparatus 10, and FIG. 4 is a perspective view illustrating an external appearance of the object detecting apparatus 10.

The object detecting apparatus 10 has an exterior coupling with a top cover 61 and a rear cover 62 through two cover clips 63, 63 as illustrated in FIG. 3 and FIG. 4. The top cover 61 has an exit window 64 for allowing the projected light L2 to pass through. The exit window 64 is transparent to the wavelength of the projected light L2 and is with a protective material preventing dust from intruding into the object detecting apparatus 10.

In the housing of the object detecting apparatus 10, the elements illustrated in FIG. 1 are implemented. The actuator assembly 32 illustrated in FIG. 1 comprises the two independent actuators. The actuator 300 performs scanning along the primary scan direction and the actuator 380 performs scanning along a second scan direction. A mirror 301 is coupled with the actuator 300.

Though not illustrated in FIG. 1, a folded minor 48 is located between the minor 41 and the collective lens 42 for changing the orientation of the returned light L4. A broken line 65 indicates a field of view (the scanned region on the exit window 64 formed by the projected light L2) of the object detecting apparatus 10 which is corresponding to the field of view 70 indicated in FIG. 1. Other configurations such as the laser drive circuitry 22, the processor circuitry 53 and the electrical connections between mentioned assembly/units in the apparatus 10 are omitted in FIG. 3 to simplify the drawing.

Those are the overall explanation of the principal configuration of the apparatus 10. Some individual configuration will be explained below.

2. An Oscillation Actuator Using a Torsion Spring (from FIG. 5 to FIG. 8B)

It has been already mentioned that the scanning assembly 30 comprises the actuators 300, 380. Since the actuator 300 is of a characteristic configuration, it will be explained in the succeeding paragraph.

FIG. 5 is the enlarged view of the outline appearance and the arrangement of the actuators 300, 380 which is illustrated in FIG. 3.

As illustrated in FIG. 5, the actuator 300 and the actuator 380 have substantial difference in their configuration.

The actuator 380 is used for deflection along the second scan direction of the projected light L2 without a requirement of high speed scan. It could be constructed by adopting a shaft with a minor coupled therein to reciprocally rotate around. The actuator 380 is configured such that a minor 381 is coupled to a shaft 382 and the shaft 382 is furtherly connected to a holder 383 to form a rotatable structure. By the magnetic interaction of a permanent magnet which is attached to the rear side of the mirror 381 and a static coil (not drawn), the mirror 381 rotates around the axis 384 of the shaft 382 and performs reciprocal scanning within a predetermined angular range corresponding to the voltage applied to the coil. The minor can also stop at a specific angular position within the scanning range by applying a predetermined voltage form.

The actuator 380 above can be classified as a galvanometer minor. Generally, a typical configuration of a galvanometer minor is to install the minor at one end of the shaft and apply the magnetic force at another end of the shaft so as to rotate the mirror. In other configurations, for example, the configuration of the actuator 380 in the present embodiment, even if the magnetic interacting force is applied from the same longitudinal section of the shaft where the minor located, the actuator can also be driven based on the same mechanism.

On the other hand, the actuator 300 is for deflecting the projected light L2 at high speed along the primary scanning direction, and thus the durability of a continuous high-speed scan for long time are required. Hence, the actuator 300 is of characteristic for these new purposes.

The detailed configuration of the actuator 300 will be explained through FIGS. 6A-6D to FIG. 8A. As an outline explanation, the actuator 300 is comprised by coupling the mirror 301 on a first side of the torsion spring 302 with a straight folded peak where the mirror 301 is implemented across said folded peak. The end of the torsion spring 302 is coupled to a static top yoke 314 as a support member. A permanent magnet is coupled to a second side of the torsion spring 302. By magnetic interaction between the permanent magnet and a static coil, the torsion spring 302 and the mirror 301 rotate around an axis 304 which is located approximately at the center of the folded peak of the torsion spring 302 and reciprocally scan within a predetermined angular range corresponding to the voltage applied to the coil.

The scanning assembly 30 reflects and deflects the laser beam L1 by the mirrors 301, 381 driven by the actuators 300, 380 and thereby projects the projected light L2 outward along the scan line 71 illustrated in FIG. 1.

It should be noted that the actuator for scanning along the second direction can also use the same configuration as that of the actuator 300 without influence to its scanning purpose.

The detailed configuration and the principle of operation of the actuator 300 will be described through FIGS. 6A-6D to FIG. 8A. FIGS. 6A-6D is an exploded perspective view briefly illustrating the structure of the actuator 300 and shows an outline to assemble such structure, and also includes a perspective view of the actuator 300 completed as a finished unit. FIG. 7 is an exploded perspective view illustrating the structure of a movable member 320 in the actuator 300. FIG. 8A is a cross-sectional view from M direction by an arrow indication where said cross-section is indicated with dash-dotted line illustrated in FIG. 6D. For the convenience, the detailed drawing of the coil assembly 313 is omitted but with a substitute of the outline of the winding of the coil.

As illustrated in FIG. 6A, the actuator 300 comprises a core yoke 311, a frame yoke 312, a coil assembly 313, the top yoke 314, and the movable member 320.

The frame yoke 312 and the top yoke 314 is made by magnetic substance and forms a wall structure surrounding the coil. The frame yoke 312 and the top yoke 314 support the coil assembly 313 therein with four screws 315 through four pairs of screw holes 312b and 314b.

The coil assembly 313 is constructed by winding two coils, a driving coil 316 and a sensing coil 317 as illustrated in FIG. 8A, around a non-magnetic bobbin 313. The coil assembly 313 might be covered with a protective cover 313c. In the center section of the bobbin 313a, there is a through hole 313b which allow the core section 311a of the core yoke 311 passing through. Further, the protective cover 313c comprises the terminals for applying a drive signal to the driving coil 316 and the terminals for outputting a signal generated in the sensing coil 317 at such positions where the terminals do not interfere with the magnetic wall.

The core yoke 311 comprises the core section 311a made of a ferromagnetic material and forms the core of the driving coil 316 and the sensing coil 317.

As illustrated in FIG. 6B, it first inserts the core section 311a through the corresponding hole 312a of the frame yoke 312, then inserts the core section 311a into the through hole 313b of the coil assembly 313 as illustrated in FIG. 6C so as to perform the position alignment of the coil assembly 313, and finally assembles the top yoke 314 and the frame yoke 312 through the screws 315 as illustrated in FIG. 6D to integrate all the members above together as an integrated unit.

In the assembly process 6A to 6B, the core section 311a is coupled to the frame yoke 312. In the process 6B to 6C, the coil assembly 313 is coupled to the core section 311a (and the frame yoke 312). It is also preferred to perform these assembly process by other types of screw not mentioned above, or by welding or bonding process, or by press fit process where a member inserted is slightly larger than a space on a reception side, or by a combination with these manufacture process.

In FIGS. 6B and 6C, the movable member 320 is omitted to save the drawing space.

The movable member 320 further comprises as illustrated in FIG. 7, a permanent magnet 321 and a holder 323 attached with the minor 301 and the torsion spring 302.

The torsion spring 302 is a spring formed by folding a metal plate by press manufacture or bending manufacture, or the like. It is in a folded shape with a straight folded peak 302c and has a V-shaped cross-section. Near the middle section of the longitudinal extended shoulder of the torsion spring 302, each planar-shaped arm 302b extends away from said shoulder and is across said folded peak respectively. At the longitudinal end section of the shoulder, another planar-shaped arms 302a also extend away from said shoulder and are also across said folded peak. The folded peak 302c and the planar arms 302a, 302b are composed as a unity. Because the torsion spring 302 is manufactured from a single metal plate by bending process to form these elements, thereby the torsion spring 302 is expected with sufficient strength and at low cost.

In the natural state of the torsion spring 302, all of the planar arms 302a and the planar arms 302b sit on the same plane. By applying a force to the planar arms 302b, they will rotate around while the planar arms 302a are still mounted on the preset plane. In this circumstance, the V-shaped folded peak 302c is twisted and the planar arms 302b rotate around the folded peak 302c. When releasing the applied force, the twist state of the torsion spring 302 will be eliminated because of the interaction of the restoring force of the spring, and thereafter the planar arms 302b will return back to the same preset plane as the planar arms 302a located on.

The permanent magnet 321 is on the opposite side to the folded peak 302c. In other words, the permanent magnet 321 is coupled to the second side of the torsion spring 302, and is attached to the planar arms 302b where its N-pole 321n and S-pole 321s located at the separated sides across the folded peak 302c. Certainly, the relative position of the N-pole 321n and the S-pole 321s is also exchangeable in FIG. 7.

As illustrated in FIG. 8A, the fixation of the permanent magnet 321 to the planar arms 302b can be implemented by sandwiching the planar arms 302b by the permanent magnet 321 and the fixation holder 323. Then the fixation holder 323, the permanent magnet 321, and the planar arms 302b are connected with one another by adhesive bonding or the like. It is also preferred to use an elastic fixation holder 323 and to make use of its elastic force for the fixation. A combination of the fixation methods can also be adopted. In addition, it is also preferred to directly form a resin holder 323 on the metal torsion spring 302 as a unity by outsert molding manufacture.

FIG. 8A is a cross-sectional view through a plane across the approximately longitudinal middle section of the planar arms 302b.

The minor 301 is coupled to the fixation holder 323 and located on the opposite side to the planar arms 302b. In other words, the mirror 301 is coupled to the first side of the torsion spring 302. If no special mention, the fixation of the minor 301 is preferred by adhesive bonding. Note that even if any adhesive might be used, an adhesive material with less shrinkage during curing is desirable.

After assembled in the process illustrated in FIG. 7, the movable member 320 above is furtherly mounted to a movable member support part 314a on the top yoke 314 based on the steps illustrated in FIGS. 6C and 6D. This fixation can be performed with any method such as screwing (screws are not shown) the planar arms 302a to the movable member support part 314a, or by adhesive bonding/welding the planar arms 302a and the movable member support part 314a together, or by inserting the planar arms 302a into a slit of the movable member support part 314a, or the like.

In the state where the movable member 320 has been mounted to the top yoke 314, the planar arms 302b of the torsion spring 302 and the permanent magnet 321 are opposed to the coil assembly 313 through the opening 314c of the top yoke 314. As more detailed illustration in FIG. 8A, one end of the axis of the driving coil 316 in the coil assembly 313 is facing a midpoint among the N-pole 321n and the S-pole 321s of the permanent magnet 321. As seen from the permanent magnet 321, the driving coil 316 is arranged on the opposite side to the torsion spring 302. In other words, the driving coil 316 described above is located on the opposite side of the torsion spring 302 beyond the permanent magnet 321.

Under this circumstance, when applying the current to the driving coil 316 so as to, for example, induce the end portion of the coil assembly 313 facing to the permanent magnet 321 to be N-pole, the S-pole 321s of the permanent magnet 321 is pulled close to the driving coil 316 and the N-pole 321n is pushed away from the driving coil 316. Therefore the force interacting with the permanent magnet 321 shall be the clockwise direction if seen in the cross-sectional view of FIG. 8A. This force is also applied simultaneously to the planar arms 302b of the torsion spring 302. As a result, the torsion spring 302 twists along the clockwise direction around a virtual rotation axis 304 which is located near to the V-shaped geometrical center of the folded torsion spring 302 if seen in the cross-sectional view. Meanwhile, the mirror 301 coupled to the planar arms 302b also rotates clockwise around the rotation axis 304.

Moreover, the torsion spring 302 will stop at a specific position where the magnetic force between the driving coil 316 and the permanent magnet 321 is balanced with the restoring force of the torsion spring 302. Certainly, the speed of the rotation and the stop position of the torsion spring 302 can also be adjusted through tuning the intensity of the current applied to the driving coil 316.

In the state where the permanent magnet 321 and the mirror 301 are rotating clockwise toward a preferred position, if one changes the current direction to the reverse thereof, since the end portion of the coil assembly 313 facing the permanent magnet 321 becomes the S-pole, the N-pole 321n of the permanent magnet 321 is attracted to the driving coil 316 and the S-pole 321s is repelled from the driving coil 316. Under this circumstance, the force interacting with the permanent magnet 321 is also changed to the counterclockwise direction if seen in the cross-sectional view of FIG. 8A. This force is also applied to the planar arms 302b of the torsion spring 302 as in the state of clockwise rotation, therefore the torsion spring 302 twists in the counterclockwise direction around the rotation axis 304 reversed to the state above. Meanwhile, the mirror 301 coupled to the planar arms 302b also rotates counterclockwise around the rotation axis 304.

By reciprocally changing the direction of the applied voltage or the applied current to the driving coil 316, the mirror 301 performs the rotation in the clockwise and counterclockwise direction reciprocally within a predetermined angular range around the rotation axis 304 as is indicated by arrows V. In other words, the mirror 301 is oscillated along a predetermined moving path. Moreover, the periodic deflection of the laser beam L1 is realized which is required for the scan along the primary scan direction described in FIG. 1.

A symmetrical reciprocating rotation of the torsion spring 302 to the natural position might be preferred if considering the lifetime thereof, but it is not a limitation in the present invention. For example, by periodically switching on or off the voltage applied to the driving coil 316, it is also possible to perform the oscillation within the range bias to the natural position. Certainly, by periodically changing the voltage or current applied to the driving coil 316 in a proper range, the mirror 301 can oscillate within any preset range as long as it is the permitted range by the torsion spring 302.

In the actuator 300, though the movable member 320 has the end portions mounted to the top yoke 314, since the actual moving portion is suspended in the air, so there is no friction between the moving components during the oscillation. As a result, even operated for long time, the actuator 300 is free of the heat and the friction problems. Accordingly, it is possible to realize the high durability through the present embodiment.

As shown in the present embodiment, because the top yoke 314 and the frame yoke 312 composed of the magnetic substance assembly surrounds the coil assembly 313, it is possible to prevent leakage of the magnetic flux generated in the driving coil 316, thereby achieving the high driving efficiency. However, the surrounding magnetic substance assembly is not essential. It is also possible to form the top yoke 314 and the frame yoke 312 to be a magnetic substance unity.

As illustrated in FIGS. 6A-6D and FIG. 8A, the movable member support part 314a of the top yoke 314 might be preferably thinner than the other portions of the top yoke 314. It allows the permanent magnet 321 to be located within the magnetic substance wall formed by the top yoke 314 and the frame yoke 312, thereby propagating the magnetic flux generated by the driving coil 316 to the permanent magnet 321 without leakage.

To prevent leakage of the magnetic flux generated by the driving coil 316, the pair of the end portions which are extended from the top yoke 314 and are facing the N-pole 321n and the S-pole 321s of the permanent magnet 321 respectively might be preferably located at the positions farther than a center line (indicated with a reference symbol 321x in FIG. 8A) of the permanent magnet 321 along the N-pole 321n and the S-pole 321s, if seen from one end of the axis of the driving coil 316 facing the permanent magnet 321 in the direction (the vertical direction in FIG. 8A) along the axis.

In the detailed embodiment, the lift-up sections 314d extend from the edges of the opening 314c toward the movable member 320 with its end portion elongating away from the driving coil 316 (the upward direction in FIG. 8A). With this configuration, it can limit the leakage of the magnetic flux. Moreover, a larger rotational moment can be generated from the driving coil 316 and applied to the movable member 320 so as to increase the oscillation speed of the minor 301 and/or reduce the power consumption as well.

If the movable member support part 314a becomes thinner as shown in FIG. 8A, the free space for the rotation between the mirror 301 and the top yoke 314 becomes smaller, and thus it might be concerned that the movable range of the minor 301 is restricted due to the mechanical interference between the mirror 301 and the top yoke 314.

To address this point, as illustrated in FIG. 8B, it is also preferred to make the movable member support part 314a thicker than the other portions so as to depart the mirror 301 from the top yoke 314. With this configuration, the permanent magnet 321 might expose outside of the top yoke 314 with the concern of the leakage of the magnetic flux. However, as long as the lift-up sections 314d are extended farther than the center line 321x as illustrated in FIG. 8B, the leakage of the magnetic flux can be prevented and it will still increase the oscillation speed and/or reduce the power consumption.

The material of the torsion spring 302 is preferred to be, for example, stainless steel or phosphor bronze, and any other material which can form an elastic spring. The reason why the cross-section of the folded peak 302c is a V-shape is that it has been found through the simulation of the inventors that both a large spring constant and the higher resonance frequency of the torsion spring 302 can be obtained through the V-shape. A high resonance frequency is desirable because it can realize large scan angle at lower driving power.

It should be noted that, the shape of the cross-section is not limited to V-shape in the present invention. Other shapes such as n-shape, U-shape, or M-shape, W-shape, or a hollow structure with a thin wall without an opening boundary is also preferred, as long as the specific shape allows the torsion spring to function.

The structure of the torsion spring with a straight folded peak 302c can increase the rigidity in the direction perpendicular to the rotation axis compared with a planar torsion spring structure. In an application with continuous vibration such as the implementation to a vehicle, the high rigidity is very useful to perform robust scan and ensure the durability of an oscillating component.

The torsion spring 302 with the folded peak 302c is a three-dimensional shape entity with large thickness. It is relatively easy to formed the torsion spring 302 by bending a plate or membrane material. On the other hand, it would be quite difficult to form such substantially high folded peak 302c by a wafer process with a technique of MEMS (Micro-Electrical Mechanical Systems).

In the present embodiment illustrated in FIG. 8A, the driving coil 316 is arranged vertical to the planar arms 302b in the natural state of the torsion spring 302. But it should be noted the orientation is not limited to such embodiment as long as the end of the axis of the driving coil 316 is facing the midpoint of the N-pole 321n and the S-pole 321s of the permanent magnet 321 in another embodiment. For example, if the axis of the driving coil 316 is arranged to be parallel to the folded peak 302c, it is also possible to perform the oscillation of the mirror 301 similar to that in the present configuration in FIG. 8A.

In addition, it is not essential to implement the driving coil 316 as a built-in element in the coil assembly 313 and wind the driving coil 316 around a bobbin. It is also preferred to directly wind the driving coil 316 around the core section 311a of the core yoke 311.

The sensing coil 317 performs the adjustment of the lighting timing of the laser beam L1 described from FIG. 9 to FIG. 12. If the adjustment is not performed, the sensing coil 317 is not necessary.

In the embodiment illustrated in FIG. 8A and FIG. 8B, the front surface of the folded peak 302c of the torsion spring 302 is facing to the mirror 301. On the other hand, the front surface of the folded peak 302c might also face to the permanent magnet 321. That is to say, the permanent magnet 321 might be coupled with the surface of the planar arms 302b such that the front surface of the folded peak 302c faces the permanent magnet 321 through a holder with the similar characteristic to the fixation holder 323, and the mirror 301 might be coupled with the opposite surface of the planar arms 302b. With this configuration, it also allows the mirror 301 to oscillate around the rotation axis of the folded peak 302c as described in FIG. 8A and FIG. 8B.

In addition, it is also possible to use an electromagnet instead of the permanent magnet 321 to drive the mirror 301 if needed. However, the permanent magnet 321 is more favorable in that it has a simple structure and low assembly error and low system noise.

3. Control of the Lighting Pulse Interval of the Laser Beam According to the Scan Position in the Primary Scan Direction (from FIG. 9 to FIG. 14)

The control of the lighting pulse interval of the beam according to the scan position in the primary scan direction of the projected light L2 will be described in the succeeding paragraphs. Note that the scan position in the primary scan direction corresponds to the orientation of the mirror 301 in the actuator 300, so the control described herein can be also understood as a control according to the orientation of the mirror 301.

Firstly, the characteristic of the oscillation of the mirror 301 corresponding to the operation of the actuator 300 is described in FIG. 9 to FIG. 11.

FIG. 9 is a graph illustrating the relation between a scan angle of the mirror 301 and an absolute velocity value corresponding to that scan angle. FIG. 10 is a chart illustrating an example of the drive signal to drive the LD module 21, and FIG. 11 is an illustration indicating an example of the projected spots of the projected light L2 distributed along the scan line.

It is found by the inventors through the experiment that the moving speed of the mirror 301 oscillated by the actuator 300 is not constant. Since the mirror 301 stops at the end points along the oscillation path and moves in the other portions, it is obvious that the moving speed changes. As indicated in FIG. 9, the speed generally becomes lower as it moves forward to the end point of the oscillation path and becomes higher as it moves backward to the middle point. The speed is almost equal at the same position regardless of the direction of the rotational movement, that is, clockwise or counterclockwise, the only difference is the direction of the movement.

Herein FIG. 9 illustrates the variation of the moving speed along the oscillation path. In FIG. 9, the position along the oscillation path (described as rotation angle, and can be called a "scan angle") is plotted as the horizontal axis and the absolute value of the angular velocity corresponding to that position is plotted as the vertical axis.

Since the rotation speed of the mirror 301 varies as illustrated in FIG. 9, when the LD module 21 is driven by a drive signal drv1 with an equal pulse interval as illustrated in FIG. 10, the temporal distribution of the spots 72 of the projected light L2 along the scan line 71 will be formed as illustrated in FIG. 11. That is to say, the spots are temporally distributed with large intervals around the middle portion of the scan line but with small intervals around the end portion along the primary scan direction. Therefore, the detection resolution of object is lower in the middle portion than that in the end portion.

In case to detect an obstacle with the object detecting apparatus 10, the detection around the middle portion of the field of view is in the most importance, so the conventional control state mentioned above is not favorable.

Hence, a control circuitry is proposed in the object detecting apparatus 10, for controlling the lighting pulse intervals for the drive signal of the LD module 21 corresponding to the scan angle of the mirror 301.

FIG. 12 illustrates a configuration of said control circuitry.

The frequency control with the control circuitry 351 illustrated in FIG. 12 can be roughly divided to three operations, driving control of the driving coil 316, a detection of rotation speed of the mirror 301, and control of the lighting pulse interval of the LD module 21. It is noted that the rotation speed can be understood as the reciprocating speed of the mirror 301.

Firstly, regarding the driving control of the driving coil 316, the control circuitry 351 sets target values of the scan range and the period of scan to the actuator 300 through a drive signal generation circuitry 352 which generates a drive signal 353 applied to the driving coil 316. The drive signal generation circuit 352 generates a drive signal 353 with a periodically variable voltage at an appropriate level according to the preset value, and applies the drive signal 353 to the driving coil 316 of the actuator 300. This allows the actuator 300 to oscillate the mirror 301 as described in FIG. 8A.

Secondly, regarding the detection of the rotation speed of the mirror 301, a detection circuit 354 detects an induced voltage generated in the sensing coil 317 of the actuator 300, and an ADC (analog-digital converter) 355 converts the voltage to a digital value in real time, and a differential calculation unit 357 compensates the voltage value and then outputs the compensated voltage to the control circuitry 351. The control circuitry 351 calculates the rotation speed of the mirror 301 based on the compensated voltage value. It is preferred but not limited to, that the number of turns of the sensing coil 317 is the same as that of the driving coil 316 and the sensing coil 317 is wound in the inverse direction of the driving coil 316.

During oscillating the minor 301, the induced voltage is due to two mechanisms in the sensing coil 317.

The first mechanism to induce a voltage in the sensing coil 317 is the induced electromotive force due to the variation of the intensity and the direction of the magnetic field induced by the driving coil 316 because of the variable voltage of the applied drive signal.

The second mechanism to induce a voltage is the induced electromotive force due to the variation of the magnetic field because of the oscillation of the permanent magnet 321. In the case where the permanent magnet 321 oscillates as described in FIG. 8A, the intensity variation of the magnetic field around the sensing coil 317 can be considered roughly proportional to the rotation angular velocity of the permanent magnet 321. This rotation angular velocity of the permanent magnet 321 is also the rotation angular velocity of the mirror 301. Therefore it can be considered that the intensity of the induced voltage in the second mechanism is proportional to the rotation angular velocity of the mirror 301.

A differential calculation unit 357 coupled with a mutually induced voltage waveform memory 356 executes the subtraction to eliminate the induced voltage generated in the first mechanism above from the output data of ADC 355.

More specifically, the mutually induced voltage waveform memory 356 stores the variation of the induced voltage form in the sensing coil 317 which is corresponding to the circumstance where one applies the drive signal to the driving coil 316 without the permanent magnet 321 attached to the actuator 300. The stored voltage form is corresponding to a period driving signal form associated with the phase information. When applying the drive signal to the driving coil 316 to oscillate the mirror 301, the drive signal generation circuitry 352 also supplies a timing signal indicating the phase of the drive signal to the mutually induced voltage waveform memory 356. Based on this timing signal, the mutually induced voltage waveform memory 356 furtherly supplies a voltage value corresponding to the present timing to the differential calculation unit 357.

The differential calculation unit 357 subtracts the voltage value supplied from the mutually induced voltage waveform memory 356 as the contribution of the first mechanism (mutual induction), from the value of the induced voltage actually generated in the sensing coil 317 supplied from the ADC 355, and then supplies the resultant difference to the control circuitry 351.

As a result, the actual value of the induced voltage proportional to the rotation angular velocity of the mirror 301 can be input to the control circuitry 351. If the induced voltage input to the control circuitry 351 is plotted in graph 361 where the horizontal axis indicates the half period from one end to another end of the oscillation range of the mirror 301, it is the similar distribution to that as illustrated in FIG. 9.

The control circuitry 351 calculates the angular velocity ω(t) of the mirror 301 at a time t, according to ω(t)=K×VR(t) by applying a preset constant K to the voltage value VR(t) output from the differential calculation unit 357.

The preset value of K is determined, for example, through an integral value of the rotation angle of the mirror 301 for the entire half period measured by other experimental means and an integral value of the voltage value VR(t) corresponding to the same half period.

Based on ω(t), the control circuitry 351 furtherly calculates the lighting pulse interval T for lighting the LD module 21 so as to obtain desired temporal resolution on a scan line 71a in the primary scan direction. Suppose the resolution is φ degree, T=π·(φ/180)/ω(t) is satisfied.

To control the lighting pulse interval of the LD module 21 in real time, the control circuitry 351 calculates the lighting pulse interval T according to the voltage value VR(t) output from the differential calculation unit 357, and then supplies a pulse repetition modulation signal indicating the value of T to a pulse generator 358.

The pulse generator 358 performs pulse repetition modulation according to the pulse repetition modulation signal and generates a timing signal of a series of the pulses with the interval value T, and then supplies the timing signal to the laser drive circuitry 22. The laser drive circuitry 22 generates a drive signal for lighting the LD module 21 at the timing of the pulses contained in the timing signal, and outputs the drive signal to the LD module 21.

Same as graph 361, we plot the calculated pulse interval output to the pulse generator 358 in the graph 362 with the horizontal axis indicating one period time of the oscillation of the mirror 301 which is from one end to another end of the oscillation range. It is understood that, the control circuitry 351 performs a control such that a shorter pulse interval is adopted to the LD module 21 when the mirror 301 moves around the midpoint of the oscillation path where the induced voltage level in the sensing coil 317 is indicated at a high level (the first level). On the other hand, in the circumstance when the mirror 301 reaches the end portion of the oscillation path where the induced voltage is indicated at a low level (second level), the lighting pulse interval becomes longer.

As indicated by the symbol drv2 illustrated in FIG. 13, the drive signal of the LD module 21 output by the laser drive circuitry 22 is characteristic with non-equal pulse intervals corresponding to the moving speed of the mirror 301. As a result, the temporal distribution of the spots 72 formed by those deflected laser beam L1 under the pulse control is compensated to have roughly equal intervals along the entire scan line 71a in the primary scan direction as illustrated in FIG. 14. Thus, it allows the object detecting apparatus 10 to perform detection of objects with a roughly uniformed resolution within the field of view 70.

Because the mirror 351 is controlled not to be moved while a single scan line is generated in the primary scan direction, such problem will not occur in the second scan direction. As a result, the adjustment of the lighting pulse interval in the second scan direction is not necessary.

It should be noted that the control circuitry 351 described above might be part of the processor circuitry 53, or might be an independent from the processor circuitry 53. The function of the control circuitry 351 might be realized by a specific hardware, or might be realized by a general-purpose computer with a software program, or might be realized by the combination thereof.

Although the control in the embodiment described in FIG. 12 is based on the voltage value of the induced voltage in the sensing coil 317, it is also possible based on the value of an induced current.

4. Configuration of the Light Reception Unit 40 (from FIG. 15 to FIG. 21)

The detailed configuration of the light reception unit 40 will be described in the succeeding paragraph. The object detecting apparatus 10 furtherly has a characteristic in that the aperture 44 is implemented on the focal plane of the collective lens 42 in the light reception unit 40 which will be concentrated to mention.

Firstly, the characteristic of the laser beam L1 projected from the light projection unit 20 will be described.

FIG. 15 is a schematic illustration to show the optical path of the laser beam projected from the light projection unit 20.

The LD module 21 of the light projection unit 20 includes a plurality of light-emitting points 21$a$1 to 21$a$3 as illustrated in FIG. 15. Each of the light-emitting points 21$a$1 to 21$a$3 emits its laser beams B1 to B3 with certain divergent angle respectively. The light-emitting points 21$a$1 to 21$a$3 locate close to one another and might be separated with a specific pitch. Certainly, the number of the light-emitting points is not limited to three. Moreover, a single light source with such plurality of light-emitting points 21$a$1 to 21$a$3 is also equivalent to said LD module 21.

The optical assembly 23 is for the purpose to generate a collimated light beam from the laser beam emitted from the LD module 21. If the optical assembly 23 is a lens assembly with convex optical power where one light-emitting point (the light-emitting point 21$a$2, for example) is located at its focal point, the laser beam B2 of the light-emitting point 21$a$2 is converted to a collimated light beam C2 along an optical axis of said convex lens due to the optical power of the convex lens.

On the other hand, the laser beams B1, B3 emitted from the light-emitting points 21$a$1, 21$a$3 which locate on the focal plane but depart from the focal point is converted to the collimated beams C1, C3 with slight inclination angles to the optical axis.

Accordingly, the entire laser beam converted from all the light-emitting points by the optical assembly 23 is generally collimated beam but with certain divergence to the optical axis. This divergence angle can be recognized to be constant even at a position sufficiently far from the optical assembly 23, and the divergence angle is defined as a divergence angle α of the laser beam L1 or the projected light L2.

Now, we describe the detailed configuration of the aperture 44 and its effects in the light reception unit 40.

Firstly, in the embodiment of the object detecting apparatus 10, a novel silicon photomultiplier (SiPM) element is used as the light-receiving element 43 in the light reception unit 40. Such SiPM is an array of avalanche photodiodes (APDs) operating in Geiger mode working in parallel with a sum output of each element therein. It is characterized with high sensitivity, high gain, fast response, and excellent temporal resolution so as to detect even a single photon.

It is known that gain of a general APD is about 50 times to the input signal (the intensity of the light incident on the light-receiving surface). On the other hand, gain of a specific SiPM element called MPPC (Multi-Pixel Photon Counter: trademark) from Hamamatsu Photonics K.K can reach about 100,000 times. (https://www.hamamatsu.com/resources/pdf/ssd/Photodetector_lidar_kapd0005e.pdf).

As a result, the returned light L4 even in very weak level could be detected by SiPM. Thus it becomes possible in an object detecting apparatus to detect the object with low reflectivity from far distance by a laser beam with low output power. Since SiPM has the gain about 2000 times to that of APD, use of SiPM will enable to detect the object by a laser beam with 1/2000 output power if compared with that of an APD.

To increase the power of the laser beam, large and expensive apparatus is required. If the laser beam with low output power is acceptable, it will be large advantage to miniaturize the object detecting apparatus and reduce the cost thereof. However, the optical detecting area of the light-receiving surface of SiPM is larger than that of APD, thus it introduced the problem too sensitive to ambient light if simply replacing an APD with a SiPM in the same optical configuration.

Such points are described in detail through FIG. 16. FIG. 16 is an illustration of the optical path of the returned light L4 passing through a collective lens 42 in case an aperture 44 is not implemented therein.

In the light reception unit 40, the collective lens 42 is designed to form an image of the incident returned light L4 on its focal plane. The focal length is defined as f. The returned light returns to the object detecting apparatus 10 from a field of view with an angle of a corresponding to the divergence angle α of the emitted light as described in FIG. 15. However, the returned light L4 is approximately regarded as a completely collimated light for convenience.

The returned light L4 incident to the collective lens 42 along the optical axis is converged to the focal point of the collective lens 42, and then diverges again. In order to receive the returned light L4 in the entire region of the light-receiving surface, the light-receiving element 43 is preferably arranged at a position behind the focal point where the returned light L4 covers the width D' of the light-receiving surface. This distance from the collective lens 42 to the light-receiving element 43 is supposed to be d'. The light-receiving element 43 might also be arranged in front of the focal point, so that it permits smaller value of d' to downsize the apparatus. However, from the viewpoint of reducing the influence of the ambient light, it is still preferred to arrange the light-receiving element 43 behind the focal point.

In the object detecting apparatus 10, not only the returned light L4 but also the ambient light is incident from various directions. Certain portions of the ambient light can reach the light reception unit 40 along the same or approximate optical path to that of the returned light L4. With consideration of the straight propagation property of light, the chief rays of ambient light X within the imaging angle φ indicated with the area of broken lines in FIG. 16 (certainly including the rays from ambient light parallel to those chief rays of ambient light X) passing through the center of the collective lens 42, will also reach the light-receiving element 43. The value of φ can be calculated approximately from φ=arctan (D'/d'), where the symbol of "arctan" indicates the operation of arc tangent.

In the case where an APD is used as the light-receiving element 43, a general diameter of the effective light-receiving surface is about 0.08 mm. Suppose d'=50 mm, so φ≈0.1 degrees is obtained and the ambient light only within this limited range would be received in the light-receiving element 43. Accordingly, the influence of the ambient light X during the object detection is limited.

However, when using SiPM as the light-receiving element 43, the equivalent diameter of the effective light-receiving surface is, for example, supposed to be about 1.3 mm, in the case of d'=50 mm, φ≈1.5 degrees will be obtained and the ambient light within considerably wide incident angle will reach the light-receiving element 43. Because SiPM has extremely high sensitivity, the light-receiving element 43 is easy to be saturated by the ambient light X when the sunlight is strong. Under this circumstance, the returned light L4 might not be detected and the ranging detection might not be performed as well.

As a consequence, the configuration described in FIG. 16 meets the difficulty if SiPM is used as the light-receiving element of the object detecting apparatus directly.

In the embodiment therein, the problem above is solved through introducing an aperture 44 on the focal plane of the collective lens 42.

The point will be described in FIG. 17 and FIG. 18. FIG. 17 is an illustration of the optical path of the returned light L4 by the collective lens 42 in the case where the aperture 44 is implemented. FIG. 18 is an illustration of the arrangement of a light passing region of the aperture 44.

The aperture 44 on the focal plane of the collective lens 42 comprises a light passing region (an opening) 44a which allows the returned light L4 to pass through and another portion performs as a light block region 44b.

The returned light L4 actually returned is approximately limited in the field of view with said divergent angle α where it is corresponding to the arrangement direction of the light-emitting points 21a1 to 21a3. Even without consideration of the aberration of the collective lens 42, an image formed on the focal plane is not point at the focal point but a spreading spot which approximately has a size of f×tan α along the arrangement direction of the light-emitting points 21a1 to 21a3 based on the prediction of the geometrical optics. As a result, in order to allow all the returned light L4 to pass through, the minimal size D of the light passing region 44a defined in the direction corresponding to the arrangement direction of the light-emitting points 21a1 to 21a3 also needs to be f×tan α. However, with consideration of the assembling tolerance, the size D is preferred to be larger than the determined minimal limit.

On the other hand, the entire field of view where the ambient light X can pass through the light passing region 44a of the aperture 44 is determined by β=arctan(D/d), where the symbol d (equal to the focal length f of the collective lens 42 in the embodiment indicated in FIG. 17) is the distance from the collective lens 42 to the aperture 44. Accordingly, if D is considerably large, the influence of the ambient light becomes large as well.

Through the simulation by the inventors, when the size D of the light passing region 44a is in a range of 1≤β/α≤3, the object detecting apparatus 10 is relatively easy to be assembled under considerable tolerance with high productivity, and the apparatus with high reliability is relatively easy to be achieved with the balance to suppress the influence of the ambient light.

With the advantage of said aperture 44, it is possible to block the ambient light outside of the view angle β of the light passing region 44a as indicated with the broken lines in FIG. 19, and furthery prevent it from reaching the light-receiving element 43. More intuitive explanation is as illustrated in FIG. 20 which is observed from the front view of the focal plane. Compared to the conventional configuration in FIG. 16, the ambient light X incident within the shadow area between the view angle φ and the view angle β defined from the optical axis of the collective lens 42 would be blocked by the aperture 44 as illustrated in FIG. 20. On the other hand, the returned light L4 incident within the view angle (divergence angle) α would pass through the aperture 44 and is furtherly incident on the light-receiving element 43 (clear area inside the view angle β) and be detected. Certainly, it is no concern if the aperture 44 also blocks the ambient light beyond the view angle φ.

Said arrangement of the aperture 44 hasn't serious influence to the cost and will not increase manufacture difficulty. Accordingly, it can be thought that the contribution of the aperture 44 will not only be favorable to reduce the influence of the ambient light in easy and low-cost way but also bring the merits to construct an object detecting apparatus with the advantage of the high sensitivity of a SiPM element. Certainly, it is not limited to use a SiPM, and other light-receiving elements are also acceptable in the present invention.

It is should be noted that the aperture 44 is not limited to that located on the focal plane of the collective lens 42 as illustrated in FIG. 17. The returned light L4 is converged to be the smallest spot on the focal plane, so that the corresponding size of the light passing region 44a of the aperture 44 can be designed smaller and be in most efficiency to block the ambient light, when the aperture 44 is located on the focal plane. One might configure the aperture 44 at a position slightly displaced from the focal plane if considering other assembling issue, as long as the light passing region 44a is designed corresponding to the size of the spot of the returned light L4 at that position, the same advantage can be obtained at certain extent. Certainly, if the displacement does almost not influence the design of the size of the light passing region 44a, it is equivalent to the condition where the aperture 44 is on the focal plane.

Not illustrated in the light reception unit 40 through FIG. 17, it should be remembered that the through hole 41a around the middle portion of the mirror 41 which allows the emitted laser beam L1 to pass through is an invalided area to guide the returned light L4 to the collective lens 42. Since the returned light L4 is not reflected by such portion of the through hole 41a, the spot incident to the light-receiving element 43 is formed, in this circumstance, with a shadow area corresponding to the through hole 41a. As a result, said shadow area will not contribute to an effective output but still occupying some areas of the light-receiving element 43, therefore substantially decrease the detection sensitivity thereof.

Hence, as illustrated in FIG. 21, it is preferred to apply a light diffusion member 46 between the aperture 44 and the light-receiving element 43 so as to spread the returned light L4 before it reaches the light-receiving element 43, to an extent where the intensity distribution of the returned light L4 becomes generally uniform on the entire light-receiving surface of the light-receiving element 43, so as to prevent decreasing of the detection sensitivity. It is preferred that the light diffusion member 46 is a frosted glass or a holographic diffuser.

5. Embodiments with Other Modifications

The embodiments in the present invention have been described. It should be noted that the concrete configuration of the object detecting apparatus, the concrete procedure of the operations, the size of each unit and the values of other parameters, or the concrete shapes of components and so on are not limited to the described embodiments.

As an example, the collective lens 42 or the optical assembly 23 could be constituted not only by a single lens but also by the combination of a plurality of lenses.

The invented characteristics described in the above sections can be separated as independent elements from such specific application of the object detecting apparatus and applied to other apparatus or system. In particular, the light reception unit 40, the actuator 300, the movable members 320, 330 and so on can be commercially distributed as an independent component. In addition, their use is not limited to the object detecting apparatus.

The object detecting apparatus 10 described above can be configured in a compact size portable on a human palm, and it is suitable for but not limited to the application of an autonomous driving vehicle for the obstacle detection. The object detecting apparatus 10 can also be mounted to a post, wall or the like for stationary surveillance purpose.

The embodiment of a software program in the present invention is characterized in that it uses a computer or a plurality of computers to cooperatively control a specific hardware, thereby to realize the adjustment of the light-emitting timing of the LD module 21 in the object detecting apparatus 10, and/or to execute the related processes described in the embodiments.

The program might be stored in ROM or other non-volatile storage media (flash memory, EEPROM or the like) predetermined in a computer. The program might also be supplied and recorded in an external arbitrary non-volatile storage media such as a memory card, CD, DVD, Blu-ray Disc or the like. It is also possible to be downloaded from an external apparatus through a network and installed in a computer, and then is executed by such computer.

Certainly, the configurations of the invented embodiments and their modified substances can be implemented if without inconsistency in any combination of each other, or be implemented by omitting some parts of them.

REFERENCE LIST

10 . . . object detecting apparatus, 20 . . . light projection unit, 21 . . . LD module, 22 . . . laser drive circuitry, 23 . . . light projection optical assembly, 30 . . . scanning assembly, 31 . . . mirror, 32 . . . actuator, 40 . . . light projection unit, 41, 48 . . . mirror, 42 . . . collective lens, 43 . . . light-receiving element, 44 . . . aperture, 46 . . . light diffusion member, 51 . . . front-end circuitry, 52 . . . TDC circuitry, 53 . . . processor circuitry, 54 . . . input/output unit, 61 . . . top cover, 62 . . . rear cover, 63 . . . cover clip, 64 . . . exit window, 70 . . . field of view, 71 . . . scan line, 72 . . . spot, 300, 380 . . . actuator, 301, 381 . . . mirror, 304, 384 . . . rotation axis, 311 . . . core yoke, 312 . . . frame yoke, 313 . . . coil assembly, 314 . . . top yoke, 315 . . . screw, 316 . . . driving coil, 317 . . . sensing coil, 320 . . . movable member, 321 . . . permanent magnet, 321s . . . S-pole, 321n . . . N-pole, 322 . . . torsion spring, 323 . . . fixation holder, 351 . . . control circuitry, 352 . . . drive signal generation circuitry, 353 . . . drive signal, 354 . . . detection circuitry, 355 . . . ADC, 356 . . . mutually induced voltage waveform memory, 357 . . . differential calculation unit, 358 . . . pulse generator, 382 . . . shaft, 383 . . . holder, L1 . . . laser beam, L2 . . . emitted light, L3, L4 . . . returned light

The invention claimed is:

1. An object detecting apparatus comprising:
a laser light source comprising a plurality of light-emitting points arranged thereon;
a collimating assembly configured to convert laser light emitted by the plurality of light-emitting points to a laser beam with a divergence angle in an arrangement direction of the plurality of light-emitting points;
a light-receiving element that is an array of avalanche photodiodes configured to operate in Geiger mode;
an optical assembly configured to project the laser beam outward along an optical axis and guide an incident light toward the light-receiving element along the optical axis;
a scanning assembly configured to periodically change projection direction of the laser beam; and
an object detecting assembly configured to detect a distance to an object located along an optical path of the projected laser beam and a direction in which the object is located, based on a projection timing and the projection direction of the laser beam and a timing of a light detection signal output from the light-receiving element,
the optical assembly comprising:
a collective optics configured to form an image of the incident light on a focal plane; and
an aperture located on the focal plane of the collective optics,
wherein $\alpha \leq \beta$ is satisfied, in which $\alpha$ is the divergence angle, and D is a size of a light passing region of the aperture corresponding to the divergence angle along the arrangement direction, and d is an effective focal distance of the collective optics, and $\beta = \arctan(D/d)$.

2. The object detecting apparatus according to claim 1, wherein $1 \leq \beta/\alpha \leq 3$ is satisfied.

3. The object detecting apparatus according to claim 1, wherein the incident light passed through the collective optics is incident on an entire light-receiving surface of the array of avalanche photodiodes.

4. The object detecting apparatus according to claim 1, further comprising a light diffuser between the aperture and the light-receiving element.

5. An object detecting method comprising:
converting laser light emitted by a plurality of light-emitting points to a laser beam having a divergence angle in an arrangement direction of the plurality of light-emitting points, by a collimating assembly;
projecting the laser beam outward along an optical axis and periodically changing projection direction of the laser beam, and guiding an incident light toward a light-receiving element that is an array of avalanche photodiodes configured to operate in Geiger mode, along the optical axis;
forming an image of the incident light on a focal plane by a collective optics;
limiting the incident light passing through the focal plane by an aperture located on the focal plane, wherein $\alpha \leq \beta$ is satisfied, in which $\alpha$ is the divergence angle, and D is a size of a light passing region of the aperture corresponding to the divergence angle along the arrangement direction, and d is an effective focal distance of the collective optics, and $\beta = \arctan(D/d)$;
making the incident light passing through the light passing region of the aperture fall on the array of avalanche photodiodes; and
detecting a distance to an object located along an optical path of the projected laser beam and a direction in which the object is located, based on a projection timing and the projection direction of the laser beam and a timing of a light detection signal output from the array of avalanche photodiodes.

6. A design method of an object detecting apparatus, the object detecting apparatus comprising:
a laser light source comprising a plurality of light-emitting points arranged thereon;
a collimating assembly configured to convert laser light emitted by the plurality of light-emitting points to a laser beam with a divergence angle in an arrangement direction of the plurality of light-emitting points;
a light-receiving element that is an array of avalanche photodiodes configured to operate in Geiger mode;

an optical assembly configured to project the laser beam outward along an optical axis and guide an incident light toward the light-receiving element along the optical axis;

a scanning assembly configured to periodically change projection direction of the laser beam; and an object detecting assembly configured to detect a distance to an object located along an optical path of the projected laser beam and a direction in which the object is located, based on a projection timing and the projection direction of the laser beam and a timing of a light detection signal output from the light-receiving element, the optical assembly comprising:

a collective optics configured to form an image of the incident light on a focal plane; and an aperture located on the focal plane of the collective optics, and the design method comprising:

determining a size D of a light passing region of the aperture in a direction corresponding to the divergence angle along the arrangement direction based on the divergence angle $\alpha$ and an effective focal distance d of the collective optics, such that $\alpha \leq \beta$ is satisfied, where $\beta = \arctan(D/d)$.

7. The design method of the object detecting apparatus according to claim 6, wherein the size D is determined such that $1 \leq \beta/\alpha \leq 3$ is satisfied.

\* \* \* \* \*